United States Patent [19]
Jen et al.

[11] Patent Number: 6,101,062
[45] Date of Patent: Aug. 8, 2000

[54] METHOD AND APPARATUS FOR UNLOADING HEAD FROM DISK BEFORE A SHOCK TO A DISK DRIVE SYSTEM

[75] Inventors: David H. Jen, San Jose; Mike Suk, Milpitas, both of Calif.

[73] Assignee: International Business Machines Corporation, Armonk, N.Y.

[21] Appl. No.: 08/986,381

[22] Filed: Dec. 8, 1997

[51] Int. Cl.[7] .................................................. G11B 21/02
[52] U.S. Cl. .......................................... 360/75; 360/78.04
[58] Field of Search .......................... 360/69, 75, 78.01, 360/105, 78.04

[56] References Cited

U.S. PATENT DOCUMENTS

| Re. 35,269 | 6/1996 | Comerford | 360/75 |
|---|---|---|---|
| 3,860,861 | 1/1975 | Gucker | 318/473 |
| 4,786,995 | 11/1988 | Stupeck et al. | 360/75 |
| 5,128,568 | 7/1992 | Carpenter | 307/590 |
| 5,434,737 | 7/1995 | Miura | 360/133 |
| 5,539,592 | 7/1996 | Banks et al. | 360/75 |
| 5,557,550 | 9/1996 | Vigil et al. | 364/557 |
| 5,559,651 | 9/1996 | Grantz et al. | 360/99.05 X |
| 5,801,311 | 9/1998 | Duell et al. | 360/77.02 |

FOREIGN PATENT DOCUMENTS

| 63-149887 | 6/1988 | Japan | G11B 21/12 |
|---|---|---|---|
| 63-261583 | 10/1988 | Japan | G11B 21/12 |
| 64-1173 | 1/1989 | Japan | G11B 21/12 |
| 403-252962 | 11/1991 | Japan | G11B 19/02 |
| 404-147463 | 5/1992 | Japan | G11B 19/00 |
| 406-203505 | 7/1994 | Japan | G11B 19/02 |
| 406-275002 | 9/1994 | Japan | G11B 21/12 |

OTHER PUBLICATIONS

"Quiescent Active Retract System For Disk File", IBM Technical Disclosure Bulletin, vol. 39 No. 11, Nov. 1996, p. 181.

*Primary Examiner*—Andrew L. Sniezek
*Attorney, Agent, or Firm*—Noreen A. Kroll; William D. Gill

[57] ABSTRACT

A method and apparatus for detecting harmful motion of a disk drive system to avoid a head crash. The motor spin current in the hard disk drive is used as a sensor to detect acceleration of the disk drive corresponding to a tipping or falling condition. In normal operation, the disk stack angular velocity (measured in revolutions per minute or RPM) is constantly monitored so that the disk drive control system can generate timing signals allowing the controller to accurately locate data addresses on the rotating disks. Disk stack RPM is accurately controlled at a constant value by a suitable feedback control loop which measures RPM and adjusts motor drive current to maintain the desired RPM. The rapidly rotating disk stack acts as a gyro system whose angular momentum resists any change in direction. In the event of a change in orientation of the disk drive such as that initiated by tipping or falling, gyroscopic forces are generated which act to increase friction of the bearings supporting the rotating disk stack resulting in a decrease in disk stack angular velocity. The change of disk stack RPM is detected by the normal feedback control loop electronics and an error signal can be generated to cause actuator park or unload action before impact of the falling disk drive occurs.

12 Claims, 25 Drawing Sheets

METHOD AND APPARATUS FOR UNLOADING HEAD FROM DISK BEFORE A SHOCK TO A DISK DRIVE SYSTEM

BACKGROUND OF THE INVENTION

1. Field of the Invention

This invention relates generally to protection systems for computer hard disk drives in portable computers and, more particularly, to a reflexive system for unloading the heads of a hard disk drive in the event the computer is dropped or jolted.

2. Description of Related Art

Portable personal computers (PCS) have become increasingly popular. Part of this popularity is due to providing portable computers with much the same power and features of desk top workstations. Among these features are hard disk drives which are now common in portable computers.

Portable computers are subject to forms of failure which are generally not a problem for desk top workstations. They can run out of power during battery operation and they can be dropped. While this latter jeopardy is a threat to every component in the system, it is the hard disk drive which has the lowest threshold of failure in the event the computer is dropped. A typical hard disk drive includes at least one rotatable magnetic disk which is supported on a spindle and rotated by a disk drive motor. The magnetic recording media on each disk is in the form of an annular pattern of concentric data tracks (not shown) on disk.

At least one slider is positioned on the disk, each slider supporting one or more magnetic read/write heads. As the disks rotate, the slider is moved radially in and out over disk surface so that heads may access different portions of the disk where desired data is recorded. Each slider is attached to a positioner arm by a suspension. The suspension provides a slight spring force which biases the slider against the disk surface. Each positioner arm is attached to an actuator assembly. The actuator assembly often includes voice coil motor (VCM). The VCM comprises a coil movable within a fixed magnetic field, the direction and speed of the coil movements being controlled by the current signals supplied by the actuator controller.

During operation of the disk drive system, the rotation of the disk generates an air bearing between the slider and the disk surface which exerts an upward force or lift on the slider. The air bearing thus counter-balances the slight spring force of the suspension and supports the slider off and slightly above the disk surface by a small, substantially constant spacing during normal operation.

The various components of the disk drive system are controlled in operation by control signals generated by a control unit. Control signals include, for example, control signals and internal clock signals. Typically, the control unit comprises logic control circuits, storage means and a microprocessor. The control unit generates control signals to control various system operations such as drive motor control signals and head position and seek control signals. The control signals provide the desired current profiles to optimally move and position the slider to the desired data track on the disk. Read and write signals are communicated to and from the read/write heads by means of a recording channel.

The hard disk drive is so vulnerable to shock because it is dependent on the maintenance of a very small gap between the drive heads and the surface of the hard disks. The size of this gap is a key factor in the quantity of data which can be stored on the disk. In general, the smaller the gap, the more data can be stored. Thus, small, and hence vulnerable, gap dimensions are the rule for hard disk drives. The technology routinely used to obtain small gap spacing is aerodynamic. The head is literally flown over the disk surface to place the head as close to the disk surface as possible without allowing contact. If the head were to contact the disk, the result could be both the destruction of the head and the removal of magnetic material (and hence data) from the disk surface.

Disk drive manufacturers recognize this hazard and attempt to address it by shock mounting their drives, by publishing the operating G-force limits their drives can tolerate, by providing a position where the heads may be "parked" which is not over data on the disk surface, and by providing an unload mechanism to lift the heads away from the disk surface so that the drive can tolerate accelerations which are far greater than are tolerable when the heads are "loaded" in the normal operating position.

The prior art describes the use of accelerometers for shock detection and to initiate strategies designed to limit the damage to the data in the event of an impact. U.S. Pat. No. 4,862,298 issued to Genheimer et al., describes an impact detection method used to generate a write-fault signal to the computing system. This signal is used to prevent data destruction by off-track writes and to cause head retraction in the event of severe impacts.

U.S. Pat. No. Re. 35,269 issued to Comerford describes a protective reflex system for a portable computer in which an accelerometer monitored by a dedicated processor detects accelerations corresponding to a falling condition and parks the heads away from data prior to impact occurring.

The problem with these techniques is that in the first case remedial action is taken after the shock event and may be too late to prevent damage to the heads and to the magnetic coating on the disk surface, and in the second case, a suitable accelerometer and dedicated processor are required adding to the system complexity and cost.

It is apparent that there is a need for a shock protection device for a hard disk drive that prevents damage to the heads and disk surfaces in the event of a fall without adding to the cost and complexity of the system.

SUMMARY OF THE INVENTION

It is an object of the present invention to provide a shock prevention device and protective reflex system for a portable computer hard disk drive which initiates protective action before the hard disk suffers the shock of an impact.

It is another object of the present invention to provide, in a portable computer hard disk drive, a method by which heads in the normal active state may be protected from impact with the disk surfaces in the event of a fall, which causes minimal increase to the cost and/or complexity of the hard disk drive.

According to the present invention, the motor spin current in the hard disk drive is used as a sensor to detect acceleration of the disk drive corresponding to a tipping or falling condition. In normal operation, the disk stack angular velocity (measured in revolutions per minute or RPM) is constantly monitored so that the disk drive control system can generate timing signals allowing the controller to accurately locate data addresses on the rotating disks. Disk stack RPM is accurately controlled at a constant value by a suitable feedback control loop which measures RPM and adjusts motor drive current to maintain the desired RPM. The rapidly rotating disk stack acts as a gyro system whose angular momentum resists any change in direction. In the event of a change in orientation of the disk drive such as that initiated by tipping or falling, gyroscopic forces are generated which act to increase friction of the bearings supporting the rotating disk stack resulting in a decrease in disk stack angular velocity. The change of disk stack RPM is detected by the normal feedback control loop electronics using the motor digital to analog converter (DAC) and an error signal can be generated to cause actuator park or unload action before impact of the falling disk drive occurs. This rapid detection and response to a falling condition avoids loss of data and damage to the disk drive magnetic recording heads and disks which might otherwise occur.

The above, as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
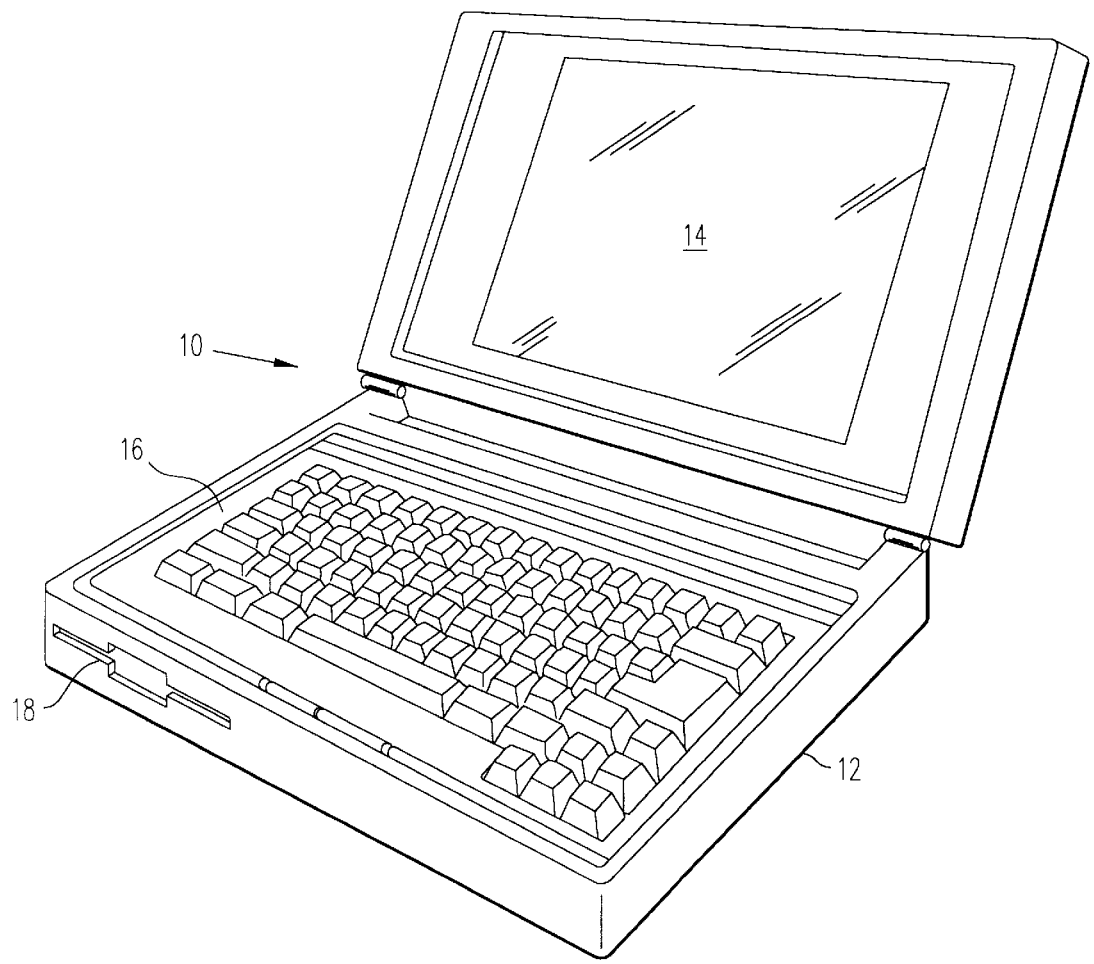
FIG. 1 is a perspective view of a portable computer of the type commonly having a hard disk drive.

FIG. 1 shows a typical portable personal computer (PC) 10, sometimes referred to as a laptop computer. The configuration shown includes a system unit case 12 to which is attached a hinged display 14 that folds down to cover a keyboard 16 for transportation. On the front of the system case 12, there is a floppy disk drive 18 and within the case is a hard disk drive (not shown).

The portable PC shown in FIG. 1 is merely for purposes of illustration. Portable PCS are configured in a variety of different ways. No matter what the outside physical configuration of the PC, most are now equipped with a hard disk drive and due to the portability of the computer, the hard disk drive is in jeopardy of damage or destruction due to the shock of an impact, such as that caused by the computer being dropped.

The time required to unload the actuator of a hard disk drive is less than 30 milliseconds. The time required to fall a distance of one foot is 250 milliseconds. The present invention is a system which will protect the hard disk drive in portable computers by rapidly sensing potentially damaging motion such as falling and unloading the actuator in that event.

Figure 2:
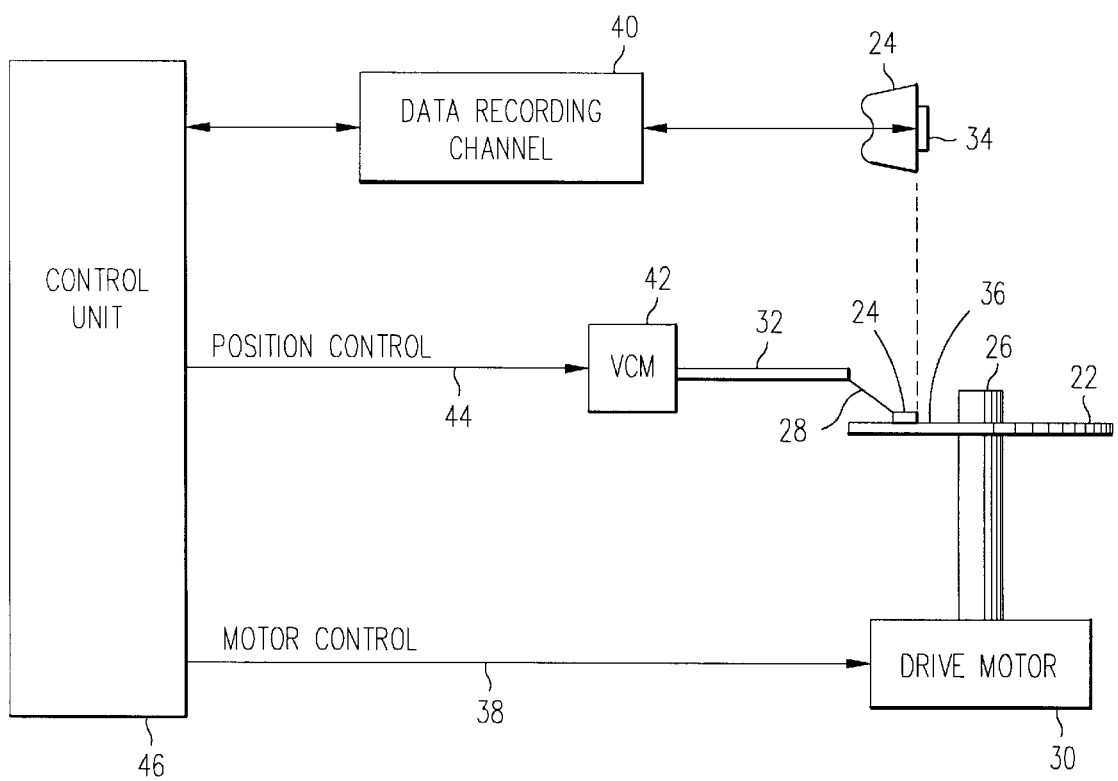
FIG. 2 is a simplified perspective drawing of a magnetic recording disk drive system.

Referring now to FIG. 2, there is shown simplified perspective view of a disk drive 20 embodying the present invention. As shown in FIG. 2, at least one rotatable magnetic disk 22 is supported on a spindle 26 and rotated by a disk drive motor 30. The magnetic recording media on each disk is in the form of an annular pattern of concentric data tracks (not shown) on disk 22.

At least one slider 24 is positioned on the disk 22, each slider 24 supporting one or more magnetic read/write heads 34. As the disks rotate, slider 24 is moved radially in and out over disk surface 36 so that heads 34 may access different portions of the disk where desired data is recorded. Each slider 24 is attached to an actuator arm 32 by means of a suspension 28. The suspension 28 provides a slight spring force which biases slider 24 against the disk surface 36. Each actuator arm 32 is attached to an actuator means 42. The actuator means as shown in FIG. 2 may be a voice coil motor (VCM). The VCM comprises a coil movable within a fixed magnetic field, the direction and speed of the coil movements being controlled by the motor current signals supplied by controller 46.

During operation of the disk drive storage system, the rotation of disk 22 generates an air bearing between slider 24 and disk surface 36 which exerts an upward force or lift on the slider. The air bearing thus counter-balances the slight spring force of suspension 28 and supports slider 24 off and slightly above the disk surface by a small, substantially constant spacing during normal operation.

The various components of the disk storage system are controlled in operation by control signals generated by control unit 46, such as access control signals and internal clock signals. Typically, control unit 46 comprises logic control circuits, storage means and a microprocessor. The control unit 46 generates control signals to control various system operations such as drive motor control signals on line 38 and head position and seek control signals on line 44. The control signals on line 44 provide the desired current profiles to optimally move and position slider 24 to the desired data track on disk 22. Read and write signals are communicated to and from read/write heads 34 by means of recording channel 40.

The above description of a typical magnetic disk storage system, and the accompanying illustration of FIG. 2 are for representation purposes only. It should be apparent that disk drive storage systems may contain a large number of disks and actuators, and each actuator may support a number of sliders.

Figure 3:
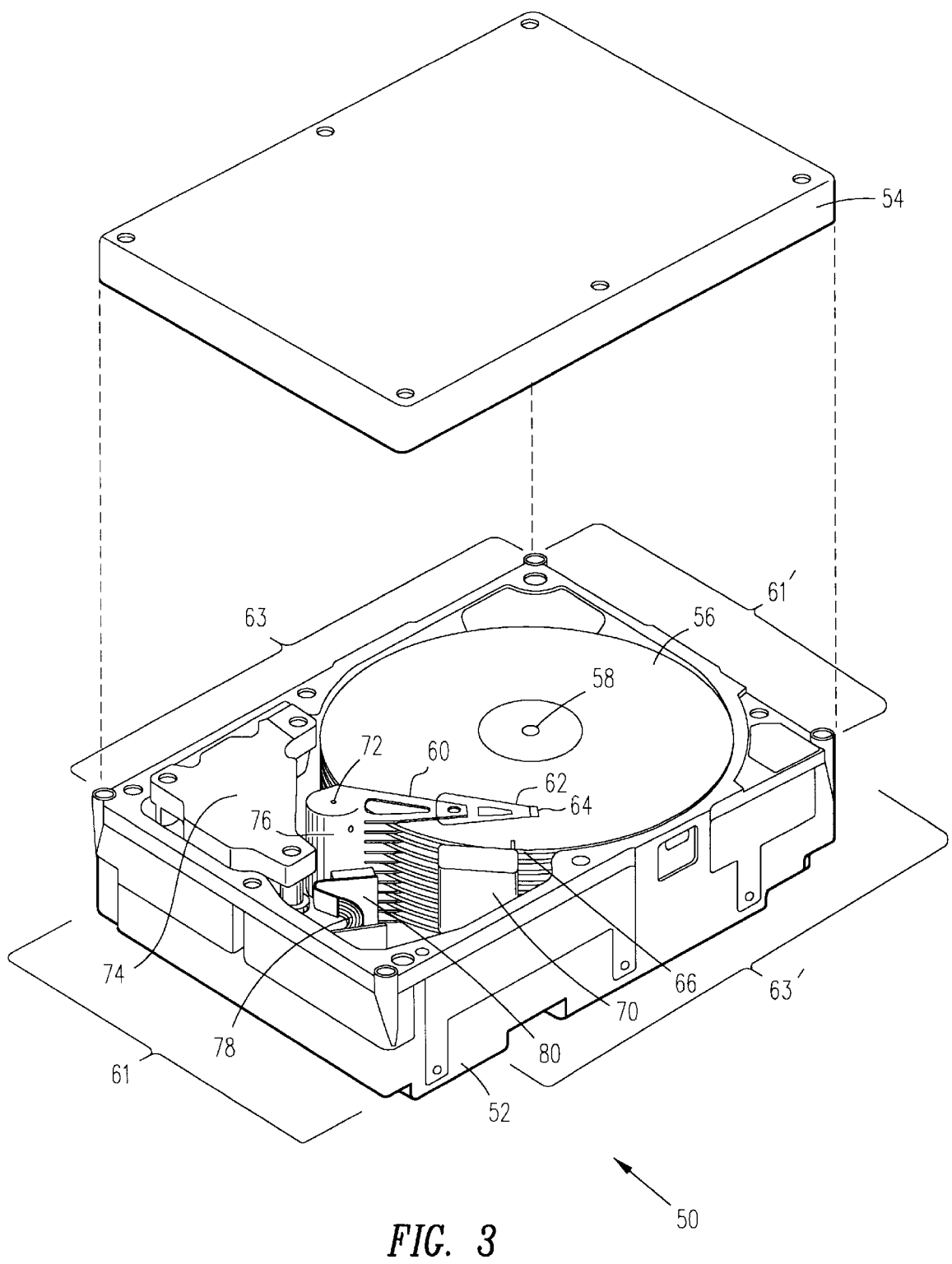
FIG. 3 is a perspective view of a disk drive.

FIG. 3 shows a hard disk drive designated by the general number 50. The lid 54 of the disk drive is shown exploded. In operation, the lid would be disposed on top of the housing 52.

The disk drive 50 comprises one or more magnetic disks 56. The disks may be conventional particulate or thin film recording disks, which are capable of storing digital data in concentric tracks. In a preferred embodiment, both sides of the disks 56 are available for storage, and it will be recognized by one of ordinary skill in the art that the disk drive 50 may include any number of such disks 56.

The disks 56 are mounted to a spindle 58. The spindle 58 is attached to a spindle motor (not shown) which rotates the spindle 58 and the disks 56 to provide read/write access to the various portions of the concentric tracks on the disks 56.

An actuator assembly 76 includes a positioner arm 60, and a suspension assembly 62. The suspension assembly 62 includes a slider/transducer assembly 64 at its distal end. Although only one slider/transducer assembly 64 of the suspension assembly 62 is shown, it will be recognized that the disk drive 50 has one slider/transducer assembly 64 for each side of each disk 56 included in the disk drive 50. The positioner arm 60 further comprises a pivot 72 around which the positioner arm 60 pivots.

The disk drive 50 further includes a read/write chip 80. As is well known in the art, the read/write chip 80 cooperates with the slider transducer assembly 64 to read data from or write data to the disks 56. A flexible printed circuit member or actuator flex cable 78 carries digital signals between the read/write chip 80 and a connector pin assembly (not shown) which interfaces with the external signal processing electronics. The connector or shorter side of the drive is indicated by reference numerals 61, 61', while the longer or drive side is indicated by the reference numerals 63, 63'.

The main function of the actuator assembly 76 is to move the positioner arm 60 around the pivot 72. Part of the actuator assembly 76 is the voice coil motor (VCM) assembly 74 which comprises a VCM bottom plate, a magnet or magnets and a VCM top plate in combination with an actuator coil. Current passing through the actuator coil interacts with the magnetic field of the magnet to rotate the positioner arm 60 and suspension assembly 62 around the pivot 72, thus positioning the slider/transducer assembly 64 as desired.

In a preferred embodiment, the hard disk file 50 is equipped with a load/unload assembly 70 which supports load/unload ramps 66 at the outside diameter (OD) of each the disks 56. The load/unload ramps 66 are positioned to lift the suspension assemblies 62 axially with respect to the disks 56 so as to unload the slider/transducer assemblies 64 from the disks 56 when the actuator assembly 76 is fully rotated to the OD of the disks 56. When the slider/transducer assemblies 64 are in the unloaded position, the slider/transducer assemblies 64 are physically separated from the surfaces of the disks 56 and are thus protected from being damaged or causing disk damage due to shock from impact such as caused by the computer being dropped.

Figure 4:
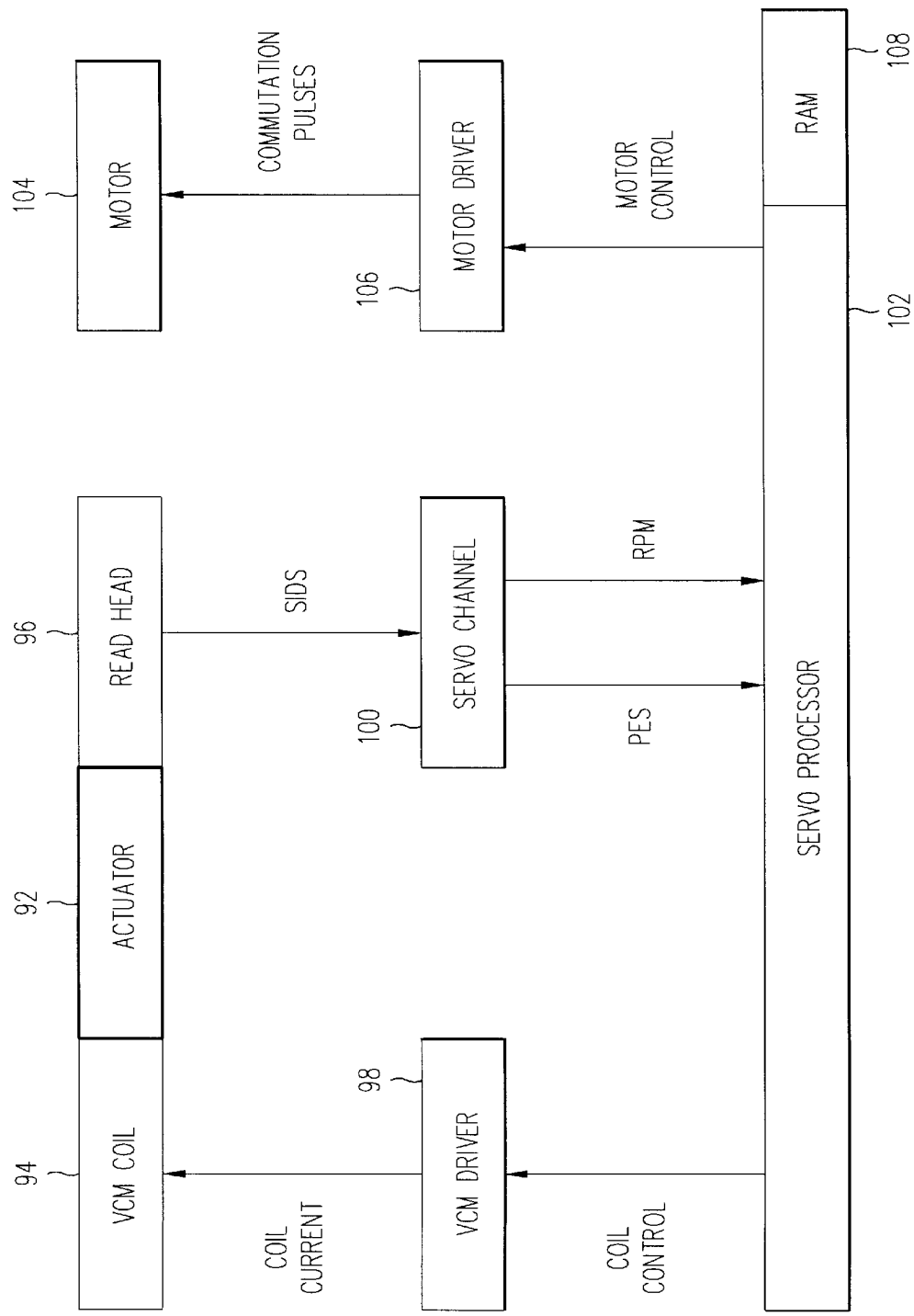
FIG. 4 is a block diagram illustrating a typical disk drive servo control system.

FIG. 4 is a block diagram illustrating a typical hard disk drive servo system used in many hard disk drives. Actuator 92 is a rotatable structure supporting the suspension assembly on which the read heads 96 are mounted and the VCM coil 94 which is part of the voice coil motor which radially positions the actuator 92 relative to the disk surfaces. In the operating disk drive, a read head 96 positioned over the desired data track on a disk reads sector identifiers (SIDS) written on sectors of the disk reserved for servo control information. The data corresponding to the SIDS is carried on signal lines to the servo channel 100 where the SID information stays in digital form where it is used by the servo processor to determine the correction to the motor spin current in order to maintain the constant operating RPM. When there is no SID signal from the heads (for example if the heads are unloaded or retracted) the motor can still maintain speed using the direct control based on back-EMF from the motor driver. This is of importance in being able to establish an "all clear" condition after the system reacts to a shock event by unloading or retracting. The system uses this to determine when it is safe to reload the heads when the motion has ceased as will be discussed in connection with FIG. 6. The RPM and PES signals generated in the servo channel 100 are sent to the servo processor 102 which processes the information and makes adjustments to the motor control and coil control output signals, respectively, in order to center the read head on track and maintain constant timing. The motor control output is sent to the motor driver 106 where it is converted to motor commutation pulses which are sent to the motor 104 that rotates the disk stack to adjust the disk RPM. The coil control output is sent to the VCM driver 98 where it is converted to coil control current which is sent to the VCM coil 94 to adjust the head radial position over the data track.

The servo processor 102 further comprises a servo processor random access memory (RAM) unit 108 which is used to store information used by the servo processor 102 to control file operations.

With continued reference to FIG. 4, the RPM and PES input signals to the servo processor 102 are analyzed and corrections are computed for each iteration represented by an update of one SID. With 60-90 SIDs per disk revolution and a disk RPM in the range from 5400 to 10,000 RPM in today's hard disk drives, the servo loop is updated every 0.1–0.2 milliseconds.

Figure 5:
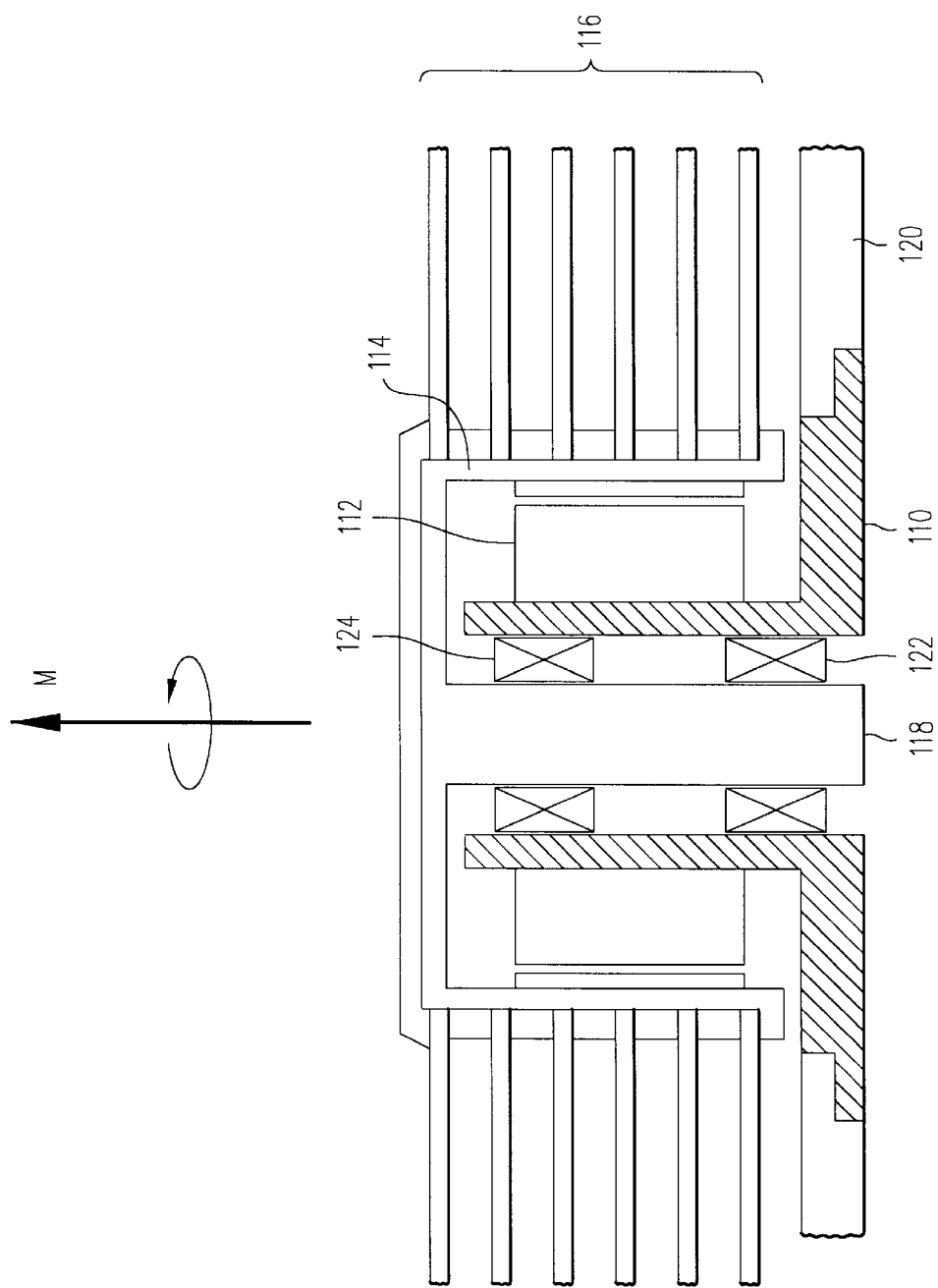
FIG. 5 is a simplified perspective view of a disk stack in a hard disk drive.

In the preferred embodiment of the present invention, the disk RPM variations as measured by the server processor 102 RPM input signal are used to detect accelerations of the hard disk drive incorporated in a PC corresponding to potentially damaging motions such as falling. Referring now to FIG. 5, there is shown a simplified cross-sectional view of a typical spindle motor assembly 110 comprising a spindle motor 112 which rotates a spindle motor hub 114 supporting a disk stack 116. The spindle motor hub 114 is fixed to and axially symmetric with a spindle shaft 118 supported by a first bearing 122 and a second bearing 124 so that the spindle shaft 118 is free to rotate about the symmetry axis. The spindle motor assembly 110 is fixed to the disk file housing 120.

The rapidly rotating disk stack 116 mounted on the spindle motor hub 114 comprises a mechanical gyro system as is known in the field of mechanical engineering. The disk stack 116 is supported by bearings 122, 124 which fix the disk stack position with respect to the file housing 120 while allowing the disk stack 116 to rotate with minimal friction. The rotating disk stack 116 has an angular momentum M due to its mass and angular velocity. In FIG. 5, the angular momentum M is represented by a arrow directed upward in the plane of the paper for the rotation direction indicated on the Figure (counterclockwise as viewed from the top). When a torque is applied to the rotating disk stack 116 that forces the angular momentum vector M of the disk stack to change direction, gyroscopic forces are generated at the bearings 122, 124 that resist gyroscopic motion of the disk stack 116. These gyroscopic forces are perpendicular to the axis of the disk stack 116 and result in additional frictional forces on the bearings 122, 124. The additional bearing friction caused by the gyroscopic forces acts to slow the rotation of the disk stack 116 and is detectable by a change in RPM as measured by the servo channel in the server processor system.

Figure 6:
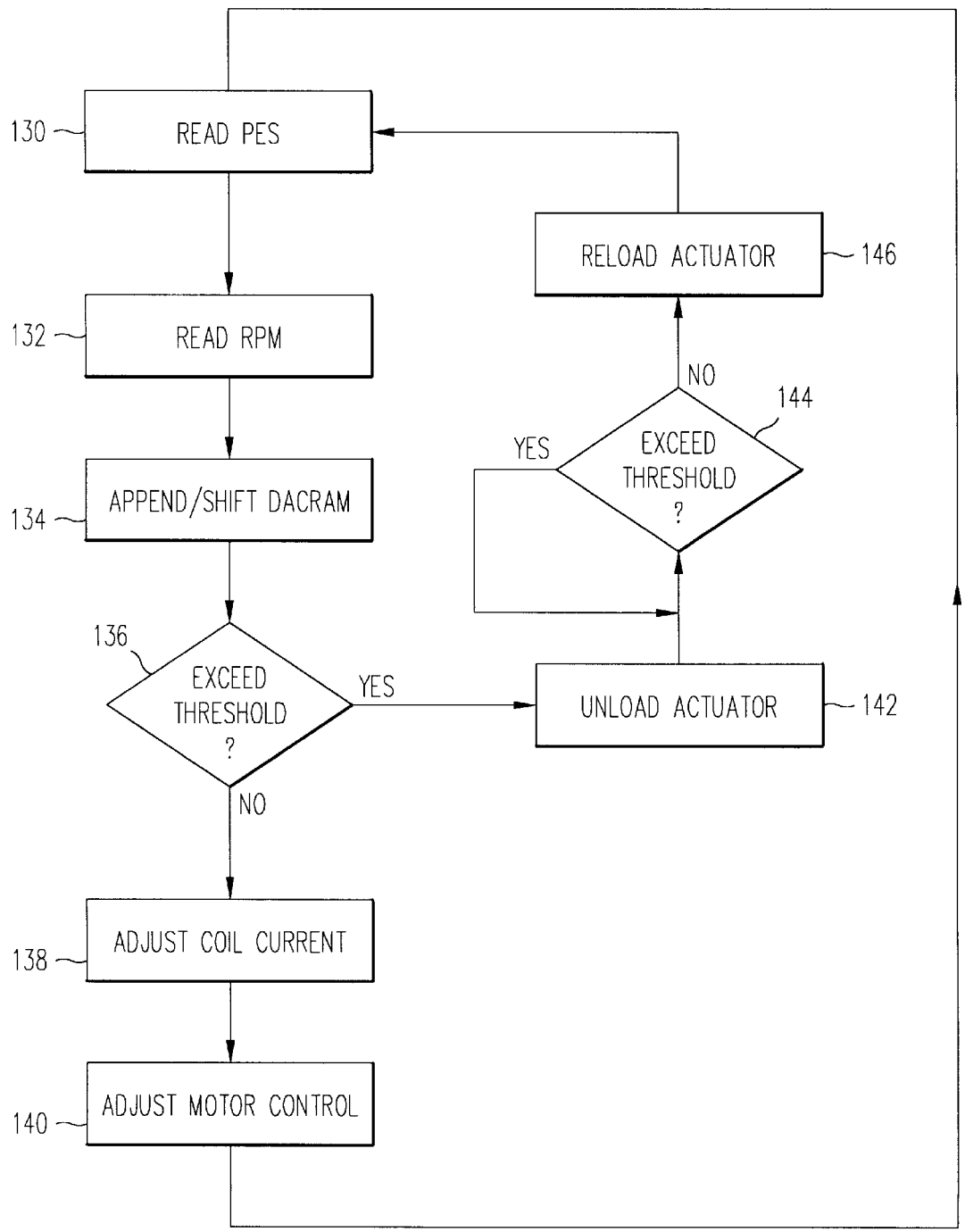
FIG. 6 is a flow chart illustrating the preferred embodiment of the unload/retract servo control loop of the present invention wherein exponential averaging of the motor DAC is used.

FIG. 6 shows the flow diagram of the preferred logic of a protective reflex system which keys off a change in RPM as measured by the servo channel in the server processor system. The process starts by inputting to the servo processor 102 the PES signal, represented by function block 130, and the RPM signal, as represented by function block 132. The motor RPM is determined by the motor DAC which is input to the controller chip and hence determines the motor RPM. The servo processor 102 takes each iteration of the digitized RPM signal, appends it to a digital vector in the random access memory RAM 108 and shifts it. This process, represented by function block 134, generates a waveform in time representing the RPM at successive SIDs. One or more exponential averages, one with a short decay time constant and the other with a long decay time constant are computed from the motor DAC signal and compared. The case when the raw motor DAC signal is used is considered an exponential average with a decay constant of one. When the short decay exponential average is more than a threshold amount from the long decay exponential average, this suggests a potentially damaging motion is occurring so a high priority interrupt is triggered to retract the actuator and unload the suspension/slider assembly, represented by function block 142. The time constants that determine the short decay and long-decay, in addition to the threshold, are designed specifically to the application. For example, for a 600 Hz sample rate, a short decay constant of 0.1 and a long decay constant of 0.01 work well together. For applications having different sample rates, these time constants may be changed to achieve the desired response to a potentially damaging motion.

The exponential average is a cumulative average of a signal based on the following formula:

$$ExpAvg(I)=K*S(I)+(1-K)*ExpAvg(I-1)$$

where I=sample index, K=decay constant (0 to 1), and S=signal vector. The exponential average corresponding to the current sample is decay constant K multiplied by the current sample added to (1−K) multiplied by the prior exponential average. The size of K determines the decay rate, a larger K causes the ExpAvg to decay faster because it weighs the current sample more highly. Decay constant K represents a mathematical weighting factor in the exponential average, ExpAvg(I), chosen to determine the relative weight of the current (most recent) sample S(I) to the previous iteration of the exponential average, ExpAvg(I−1). Therefore a high value of K is chosen for a time constant where rapid response to sudden changes in the signal is desired. A low value of K is chosen for a time constant to provide a reference ExpAvg of slow variations of the signal to which a rapid response is not desired.

At this point in the flow diagram, the main reflexive action, i.e., unloading of the sliders, has been accomplished. Further action can optionally be taken to enhance the protective system according to the invention. Following the unload action, the system continues to check the motor DAC exponential average delta, represented by function block 144, so that reload of the sliders, represented by function block 146, only takes place once the system is deemed stationary for a period of time. Alternatively, a power down procedure (not shown) may be called shutting down the entire hard disk drive.

Returning to the decision block 136, if the thresholds have not been exceeded, the signal processor 102 adjusts the coil current and motor control, represented by function blocks 138 and 140 respectively. This action represents the normal control function of the servo processor 102 in maintaining read head on-track position and constant disk stack RPM.

As it is used herein, motor DAC represents the amount of motor spin current on the output side of the servo system, not the input side. This, however, is not an important distinction in terms of the way the system works, because the servo system is designed to hold the motor speed constant, so the output equals input due to the effort of the servo system. Stated differently, if there is a disturbance or fluctuation that causes motor speed to change, the input side will detect the change, and a commensurate correction is applied to the output side. Thus, either the input side signal or the output side signal may be used in order to determine a motion event in the drive.

Figure 7A:
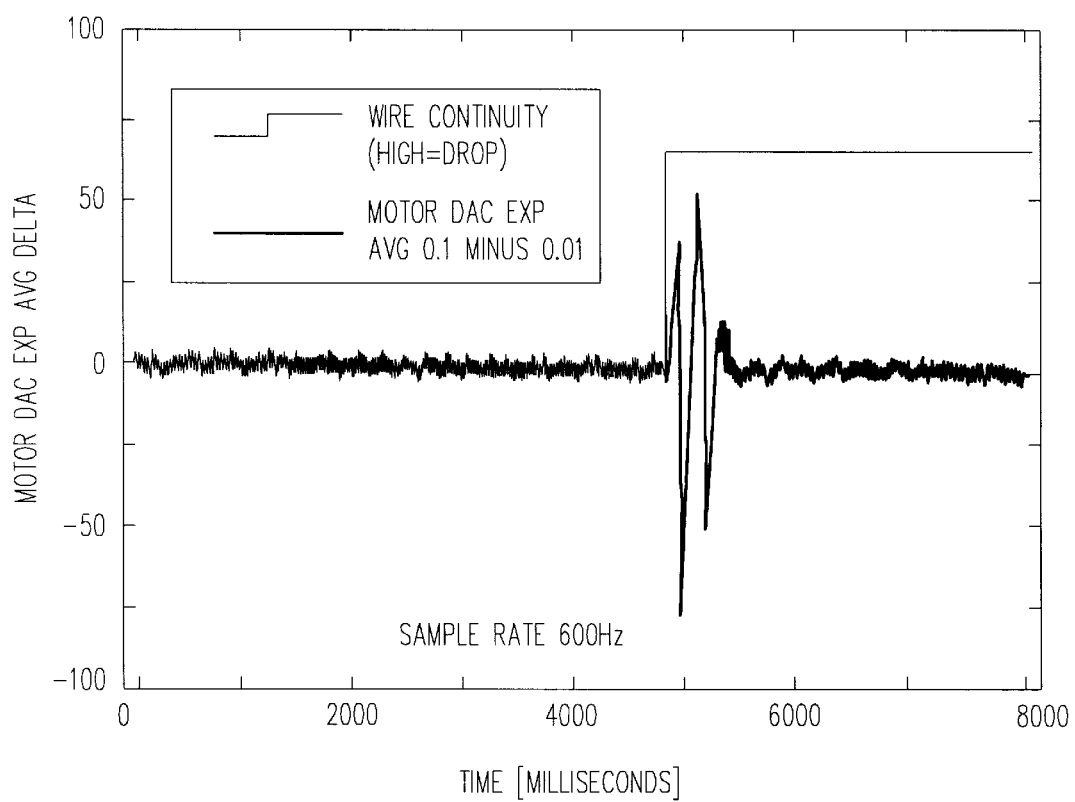
FIGS. 7a–c shows the exponential average delta of the motor DAC verses time for various file drop scenarios.
Figure 7B:
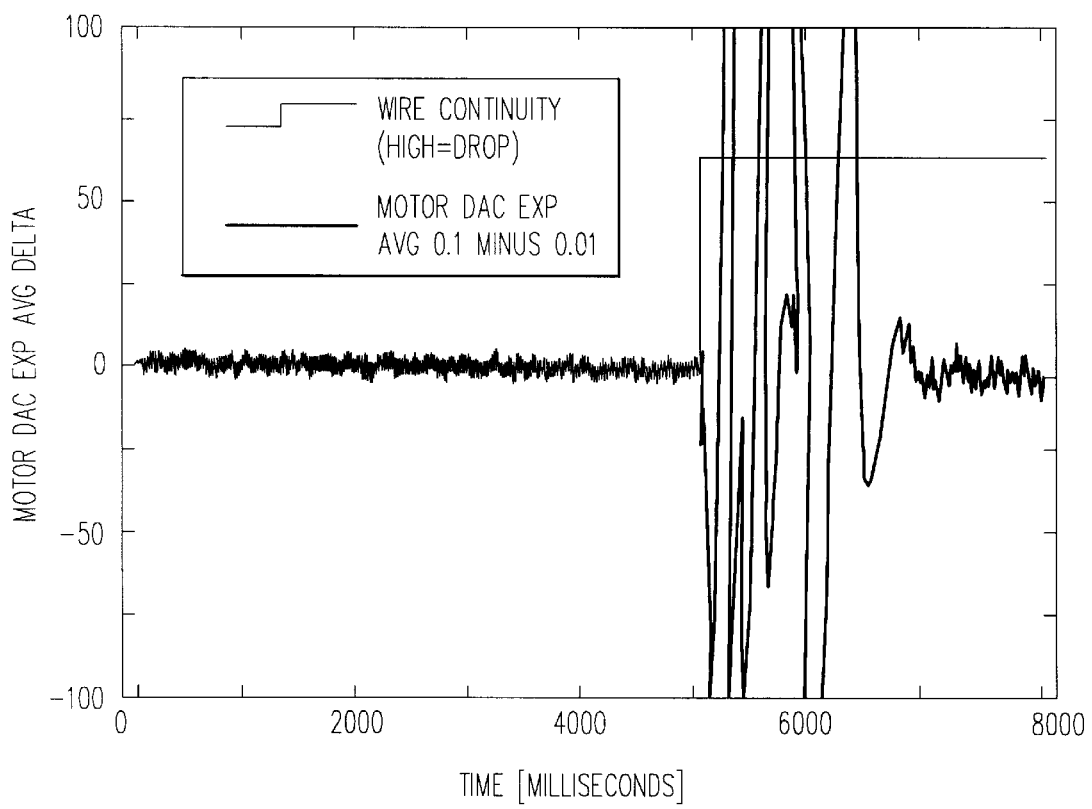
Figure 7C:
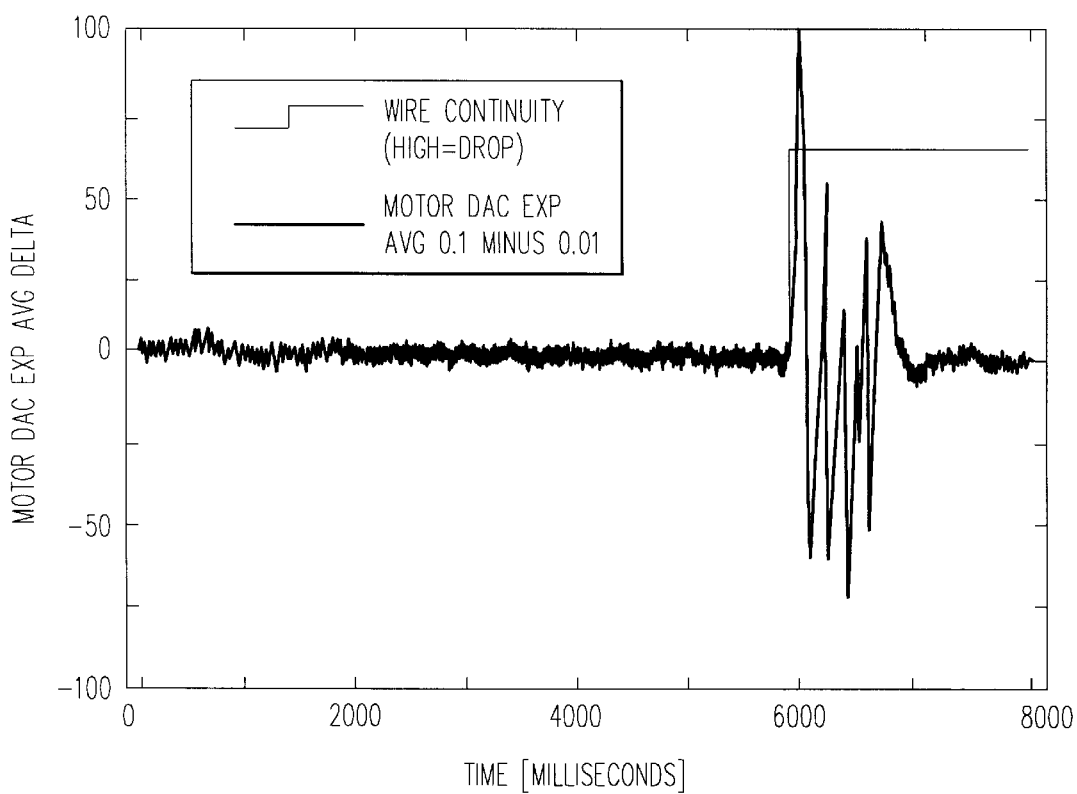
Figure 8A:
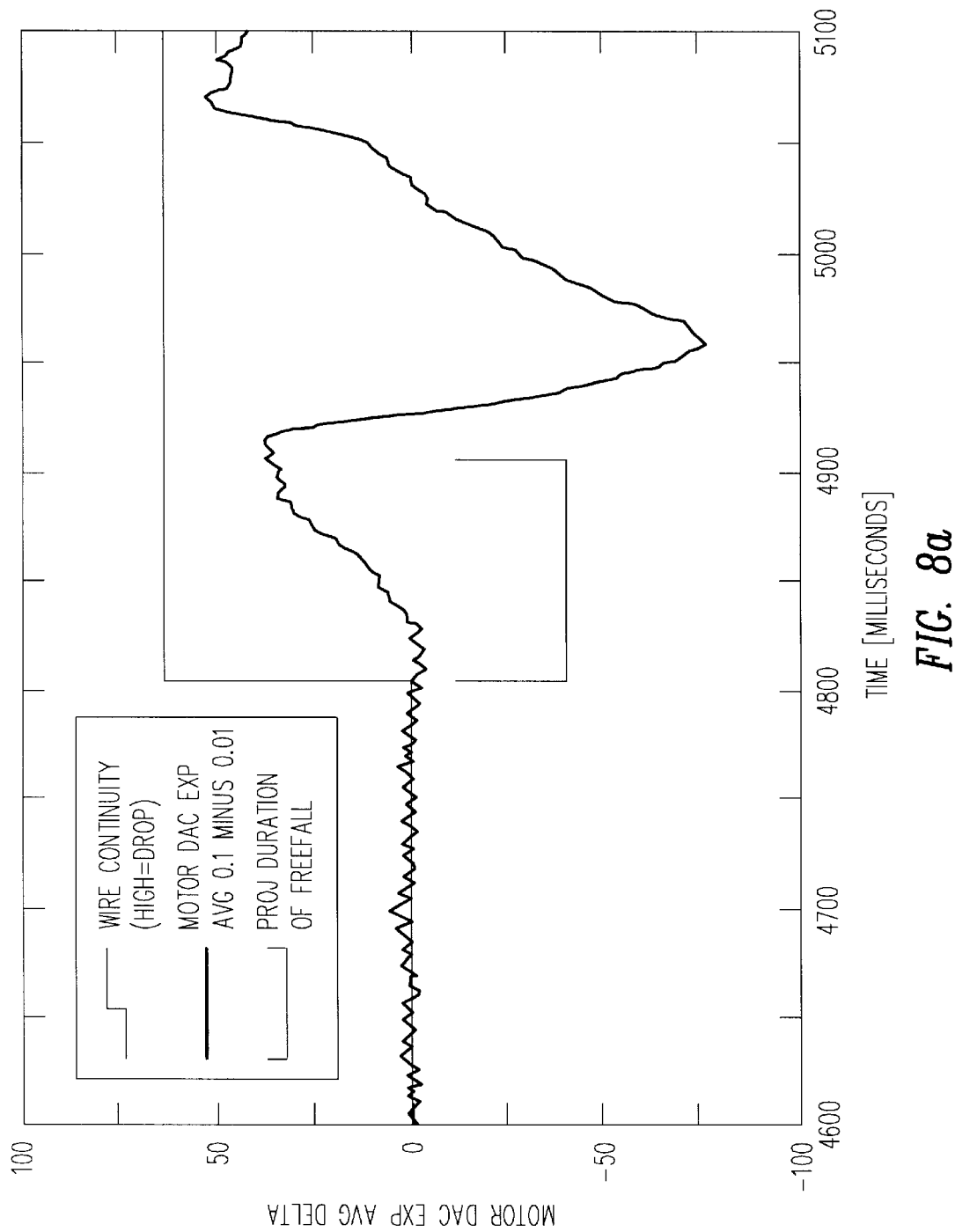
FIGS. 8a–c show an enlarged time trace of FIGS. 7a–c of the exponential average delta of the motor DAC.
Figure 8B:
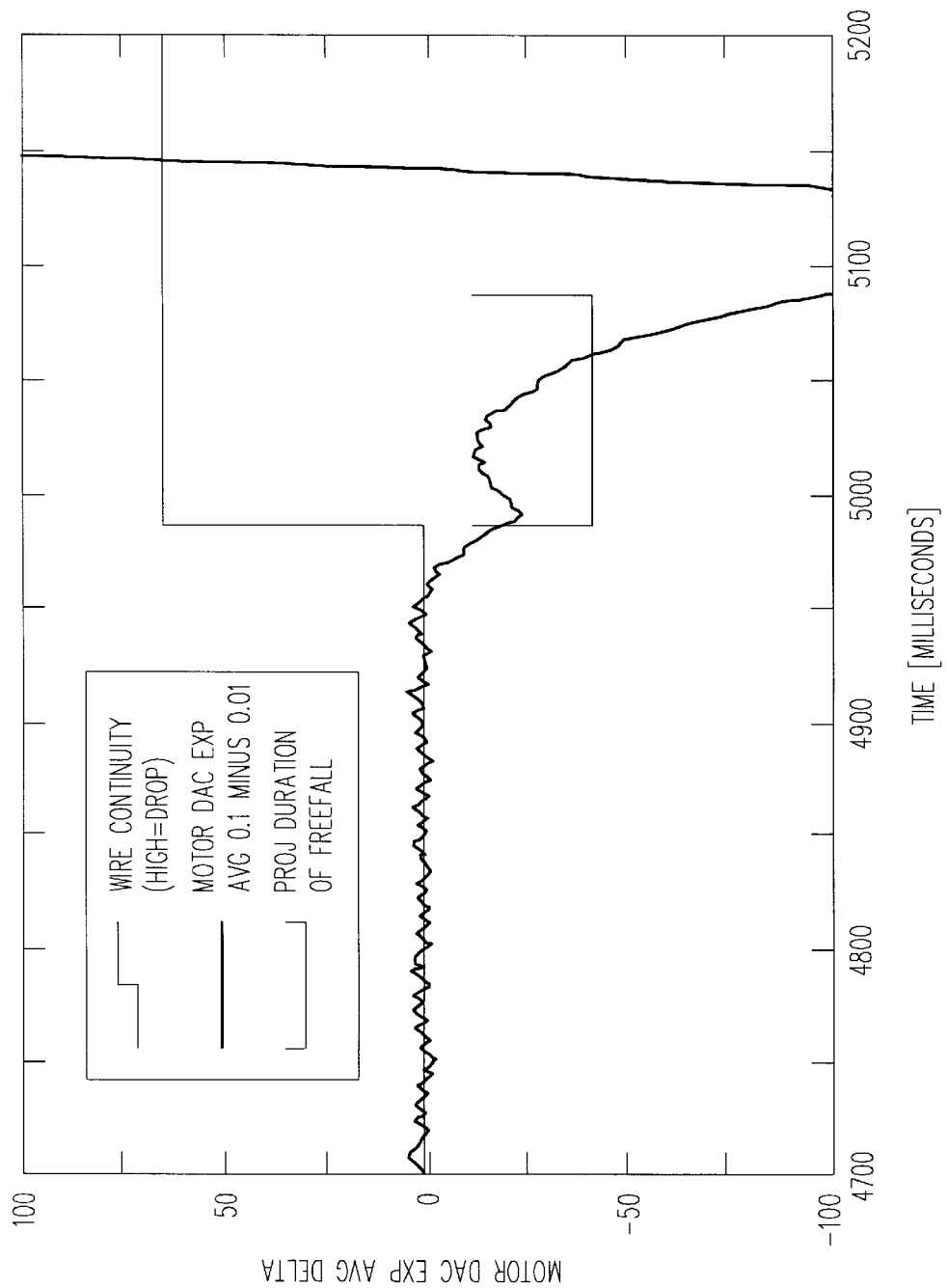
Figure 8C:
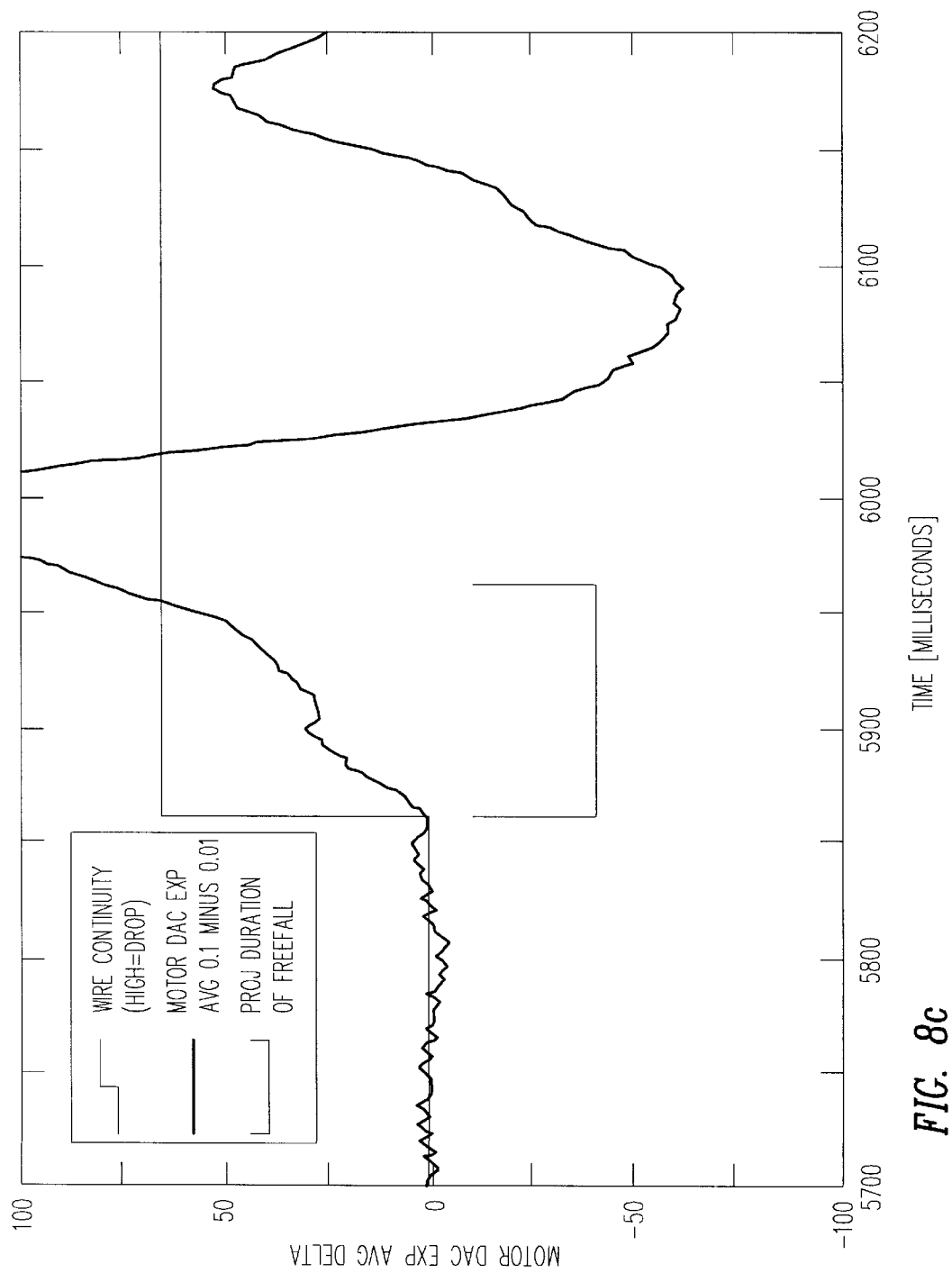

FIGS. 7a–7c and 8a–8c illustrate examples of the exponential average delta of the motor DAC, showing a 0.01 decay constant minus the exponential average (ExpAvg) of motor DAC with 0.1 decay constant. More specifically, FIG. 7a shows a 6 cm vertical drop of the disk drive parallel to the motor axis; FIG. 7b shows an 8 cm vertical drop of the disk drive on the side perpendicular to connector side 61; and FIG. 7c shows a 7 cm roll of the disk drive on the axis of the connector side 61. FIGS. 7a–7c were generated at a 600 Hz motor DAC sample rate for a total of 5000 point scans. FIGS. 8a through 8c are enlarged time traces of the waveforms shown in FIGS. 7a through 7c. FIGS. 8a–8c were generated at a 600 Hz motor DAC sample rate with a 500 ms enlargement of the scans. This method of using exponential averaging of the waveforms is the preferred method of detecting harmful motion because it provides a clean threshold signal which may be more quickly accessed by the disk drive controller. A data point representing the waveform is stored for comparison purposes.

Figure 9:
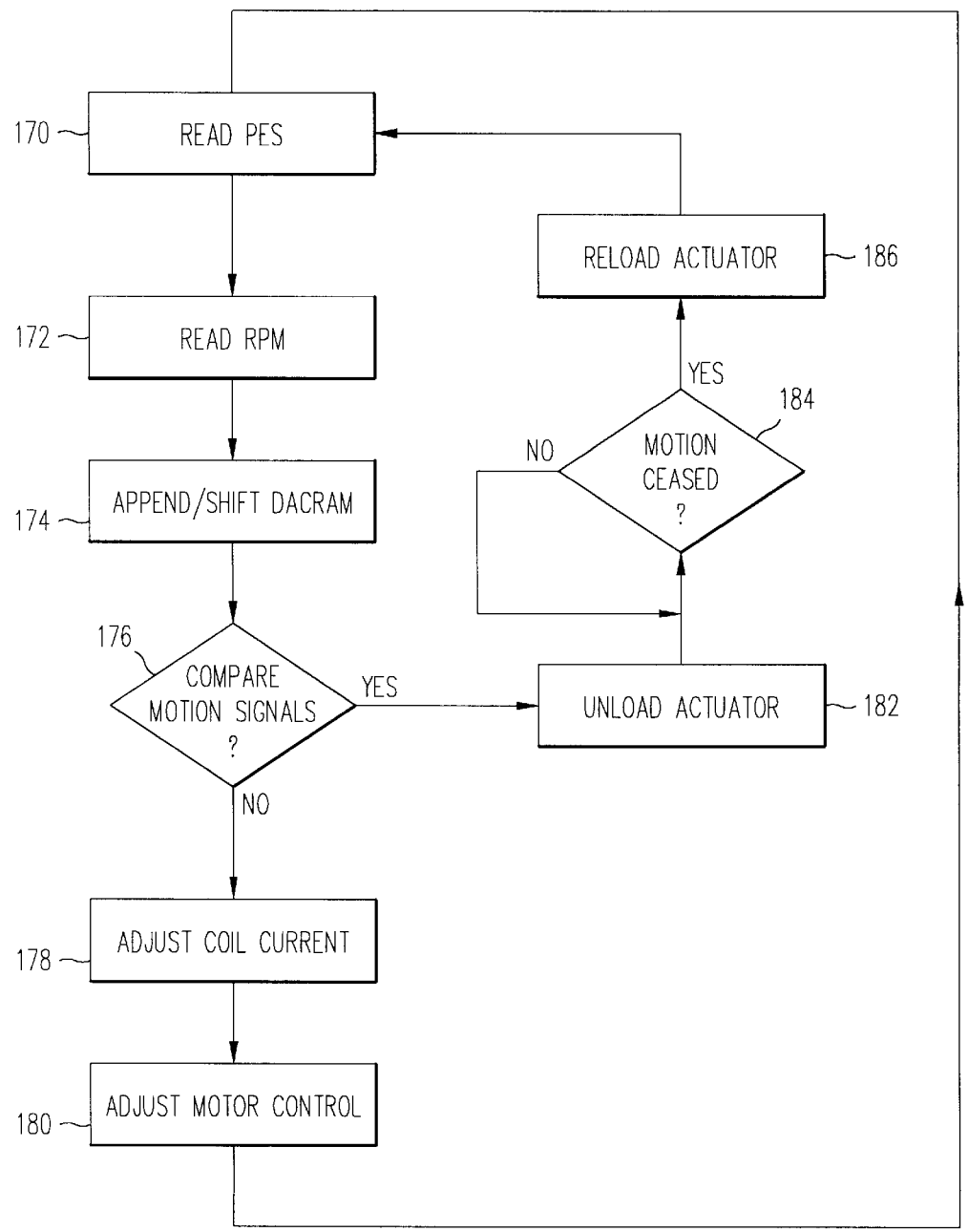
FIG. 9 is a flow chart illustrating the preferred embodiment of the unload/retract servo control loop of the present invention wherein motion signature time stamps are used.
Figure 10A:
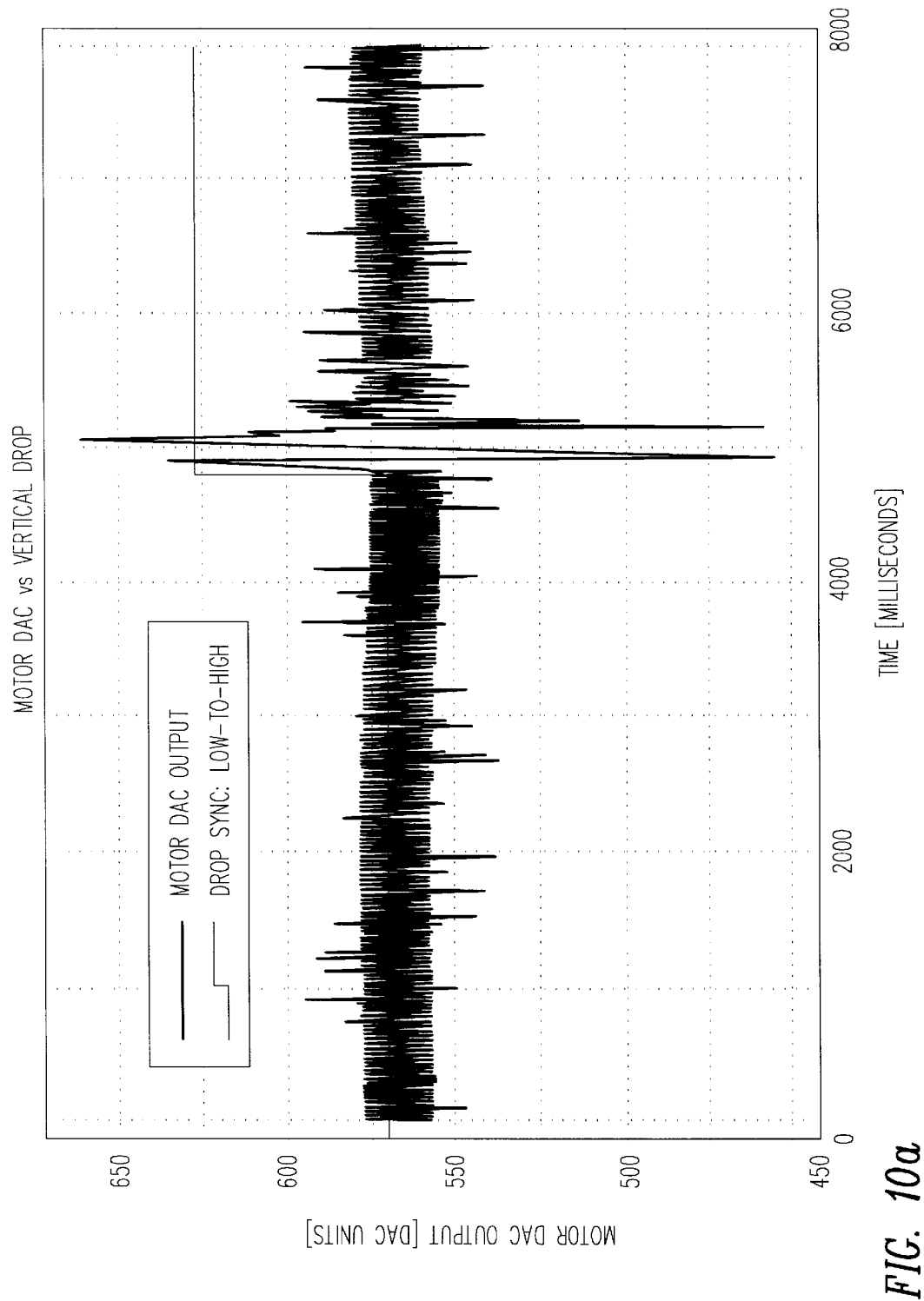
FIGS. 10a–d are a series of waveforms illustrating a vertical drop of the disk drive.
Figure 10B:
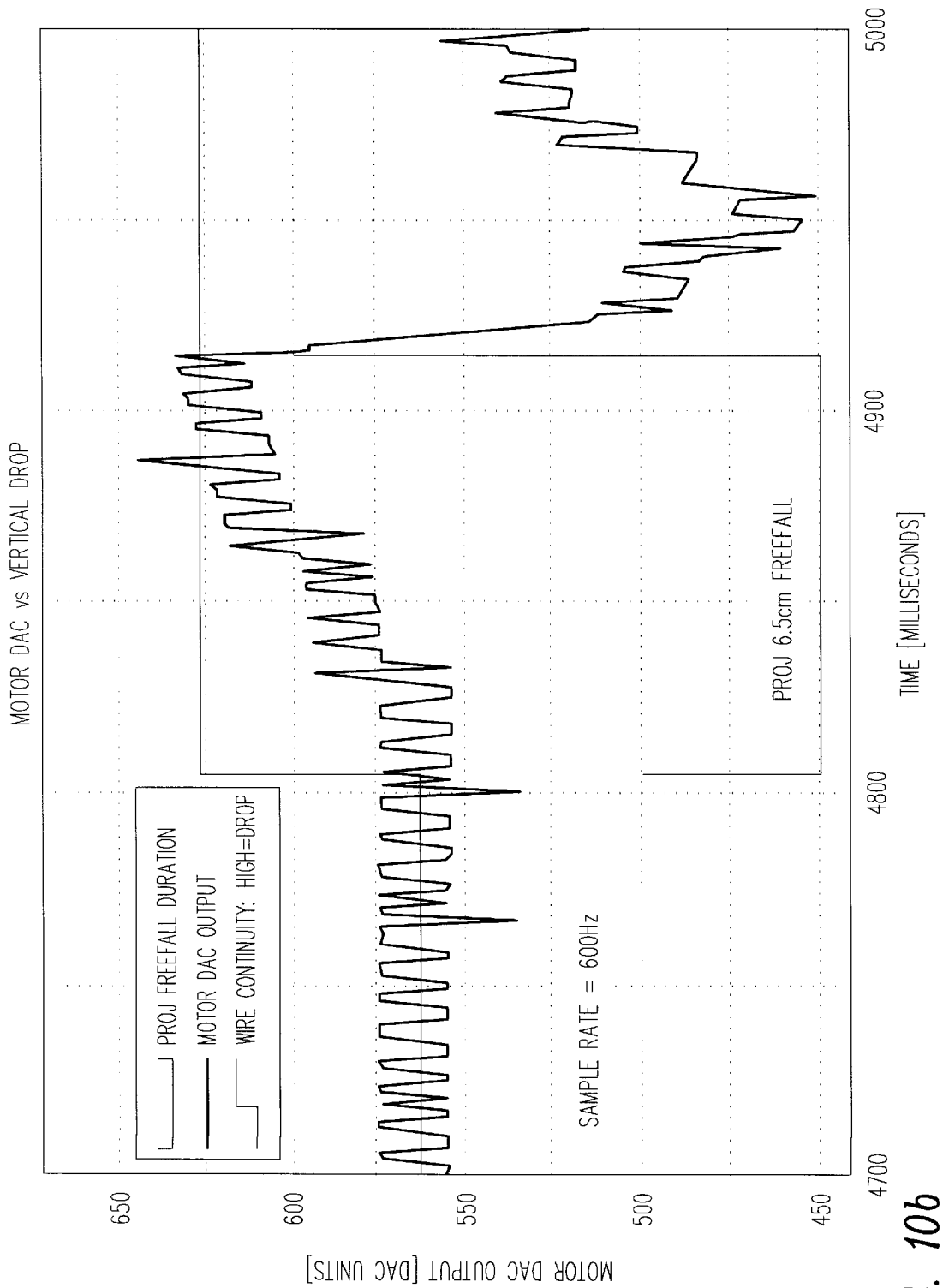
Figure 10C:
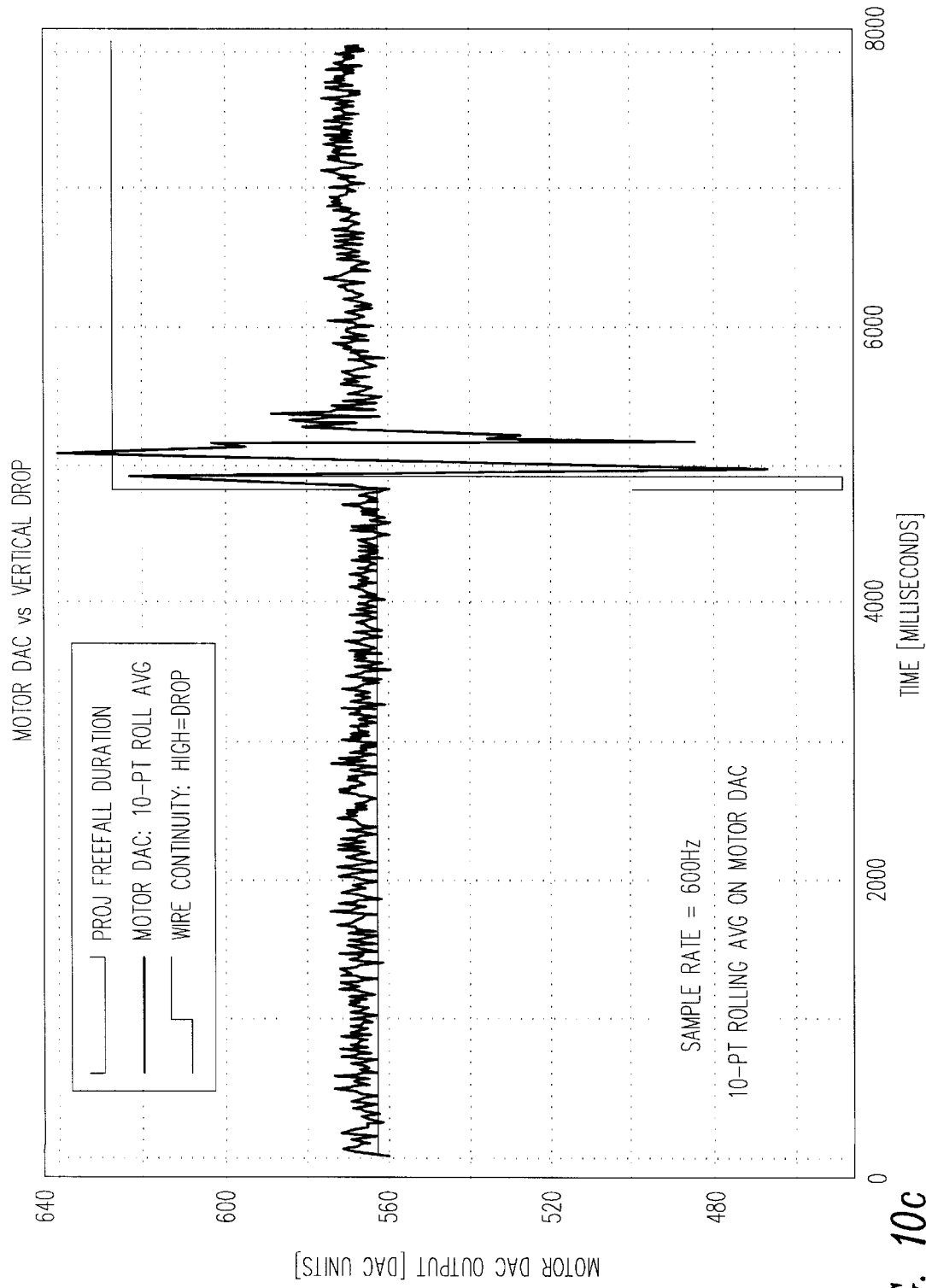
Figure 10D:
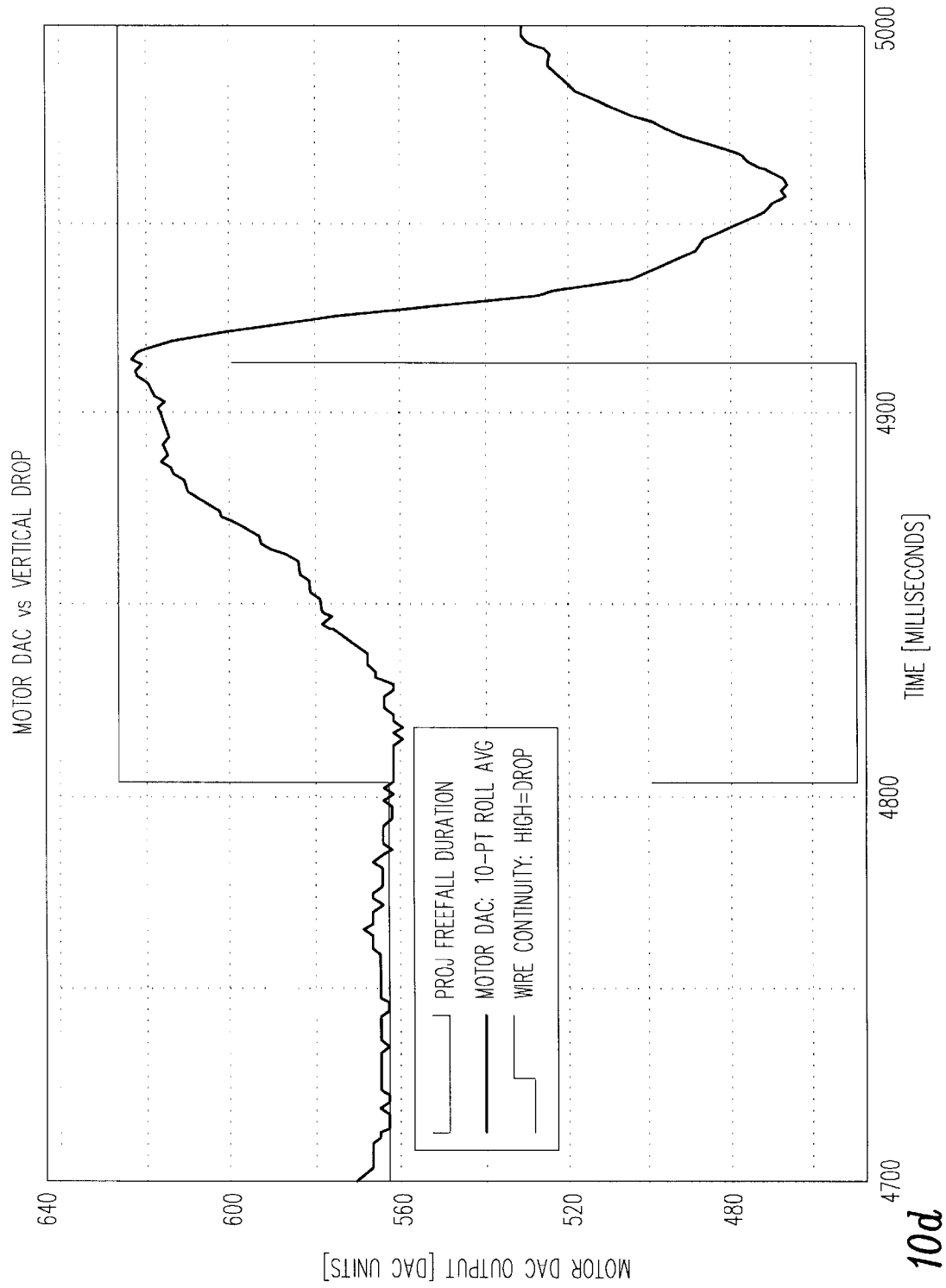
Figure 11A:
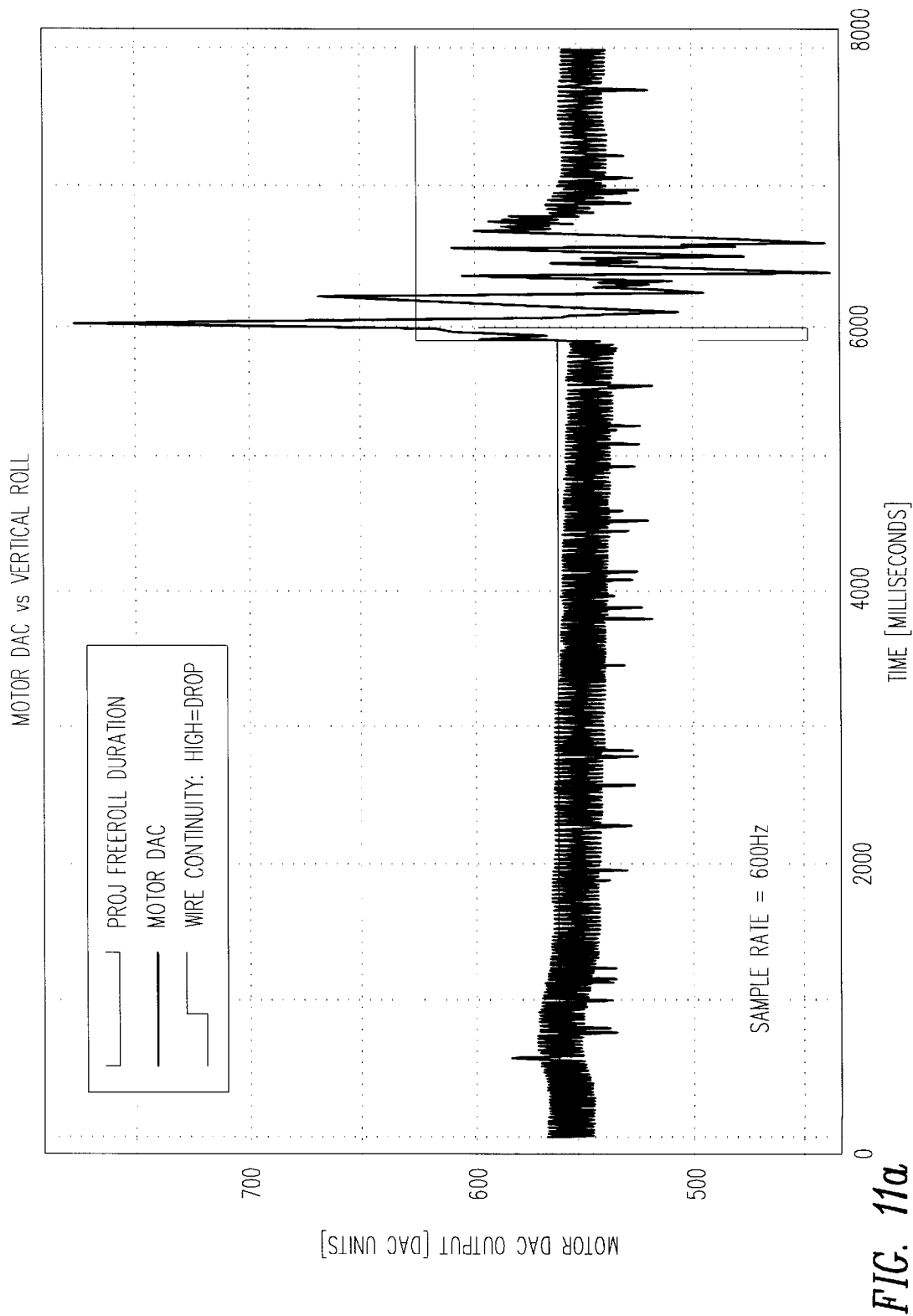
FIGS. 11a–c are a series of waveforms illustrating a rolling drop of the disk drive around the axis of the connector side.
Figure 11B:
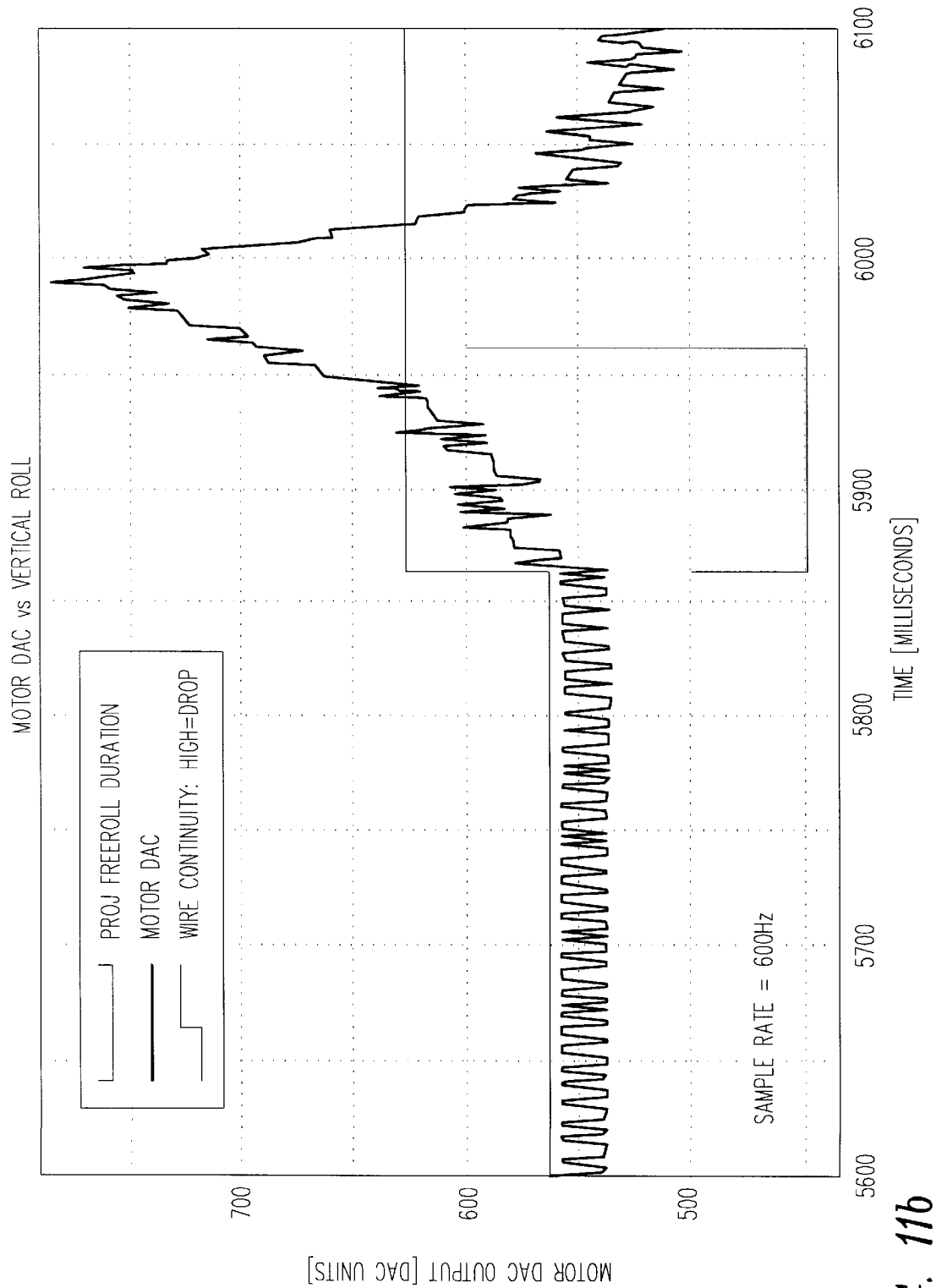
Figure 11C:
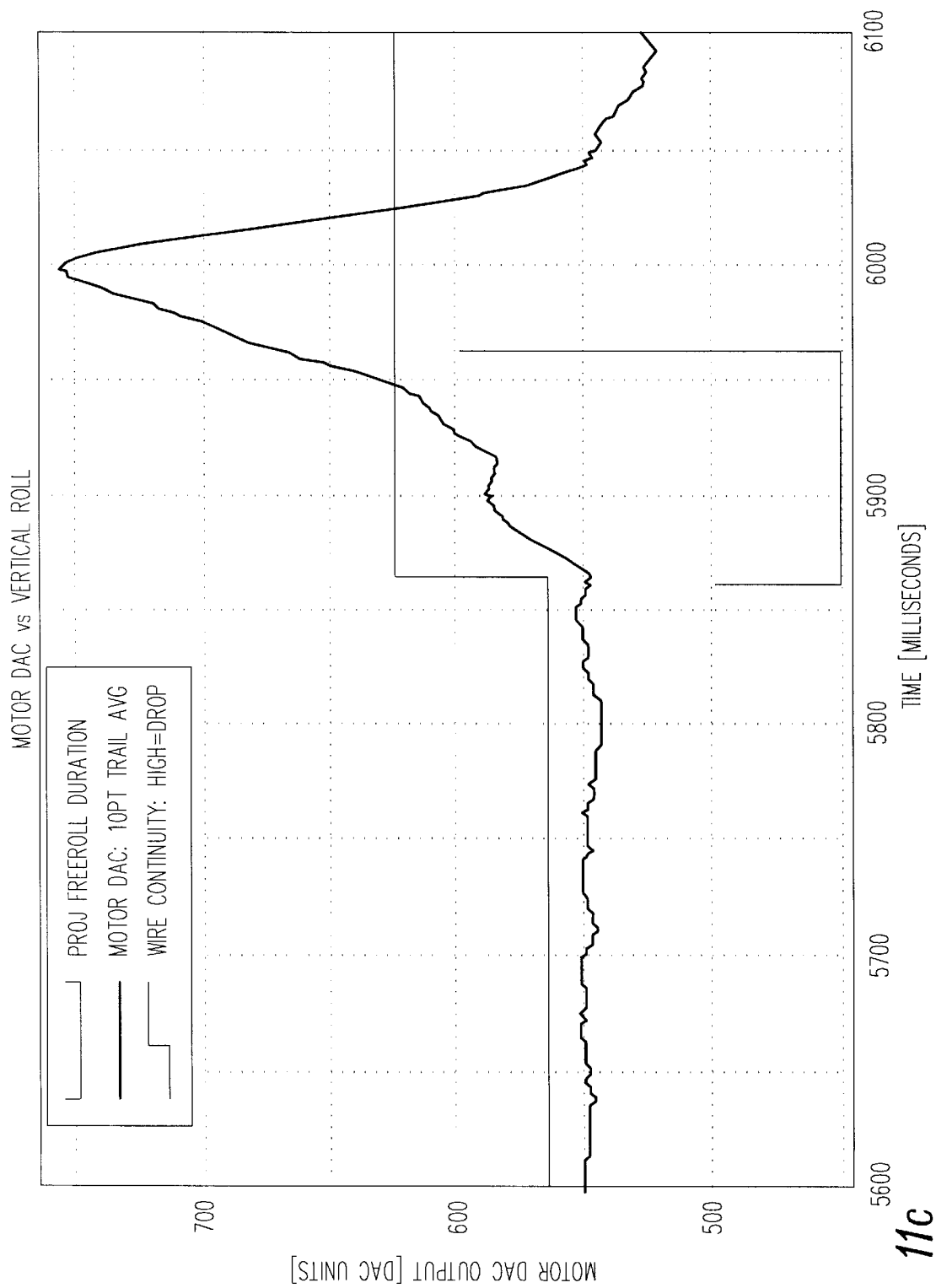
Figure 12A:
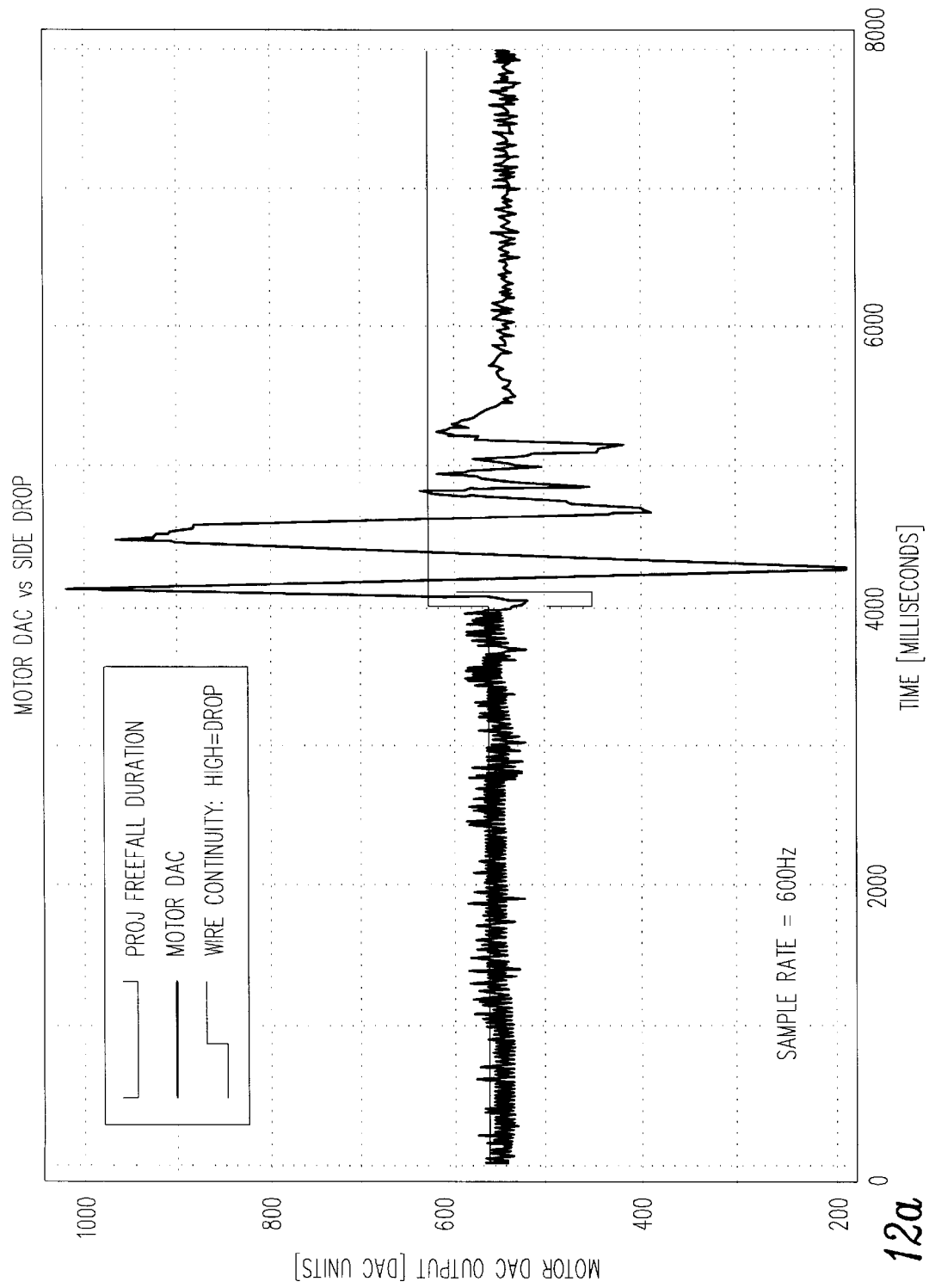
FIGS. 12a–c are a series of waveforms illustrating a side drop of the disk drive perpendicular to the axis of the connector side.
Figure 12B:
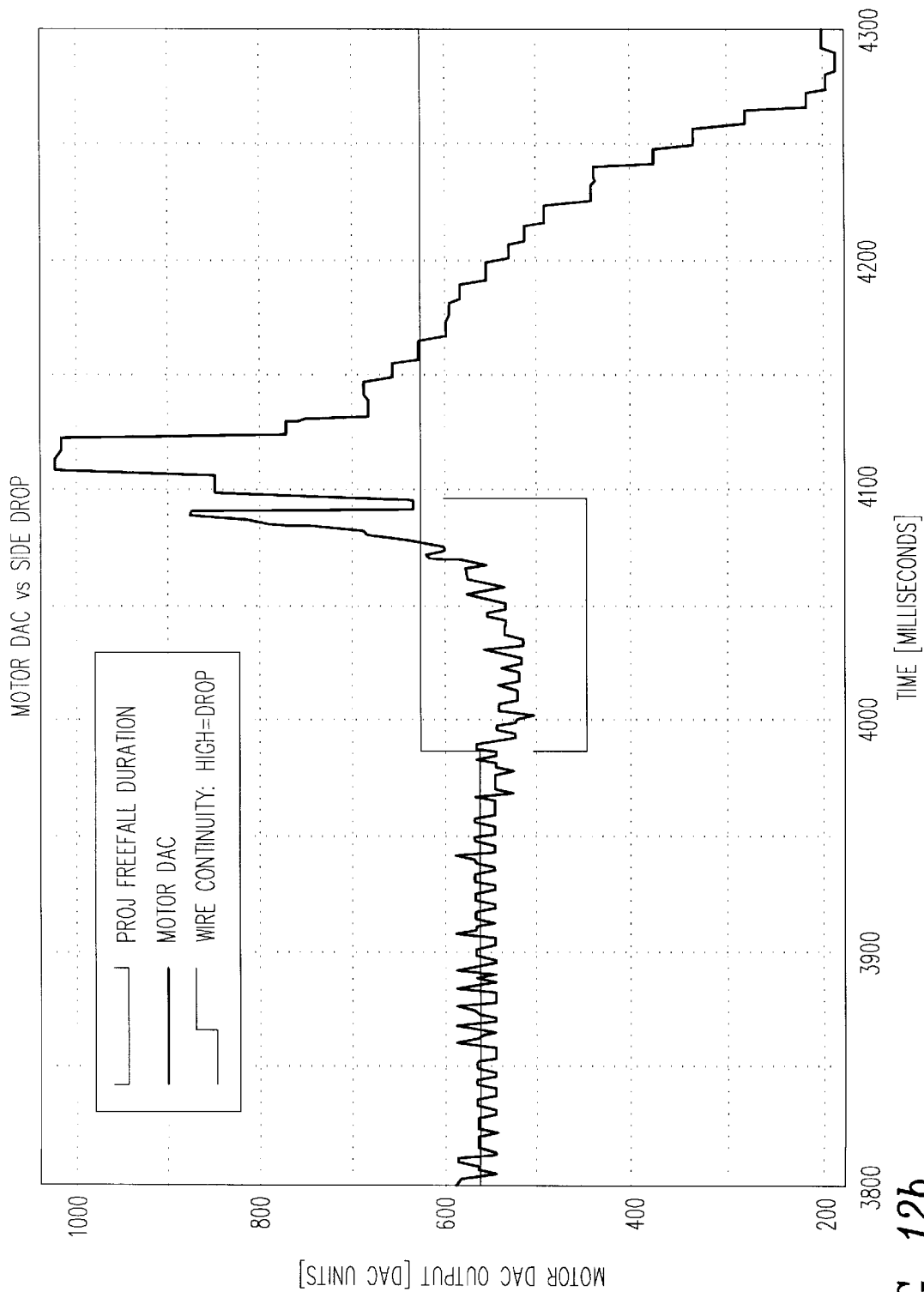
Figure 12C:
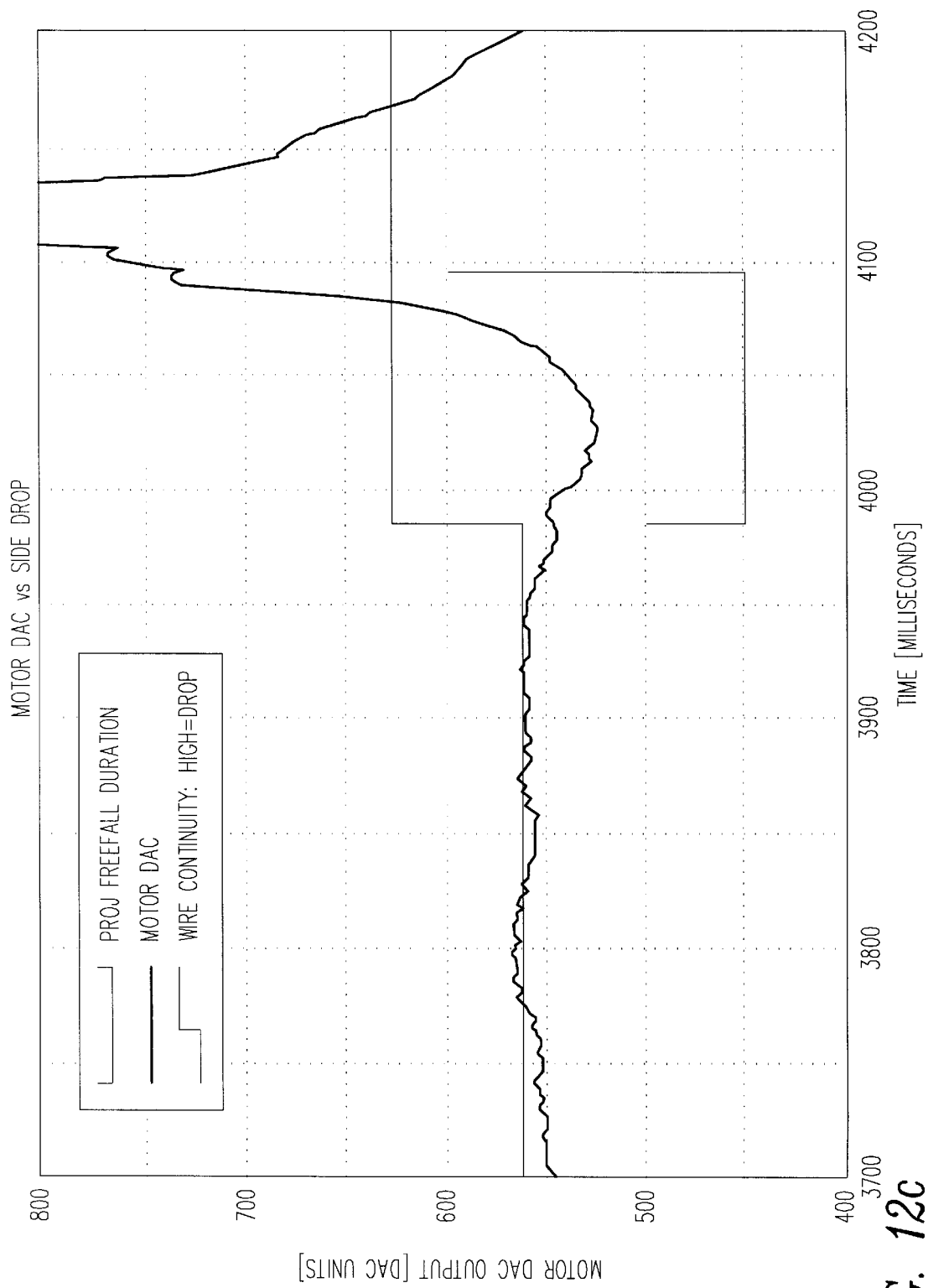
Figure 13A:
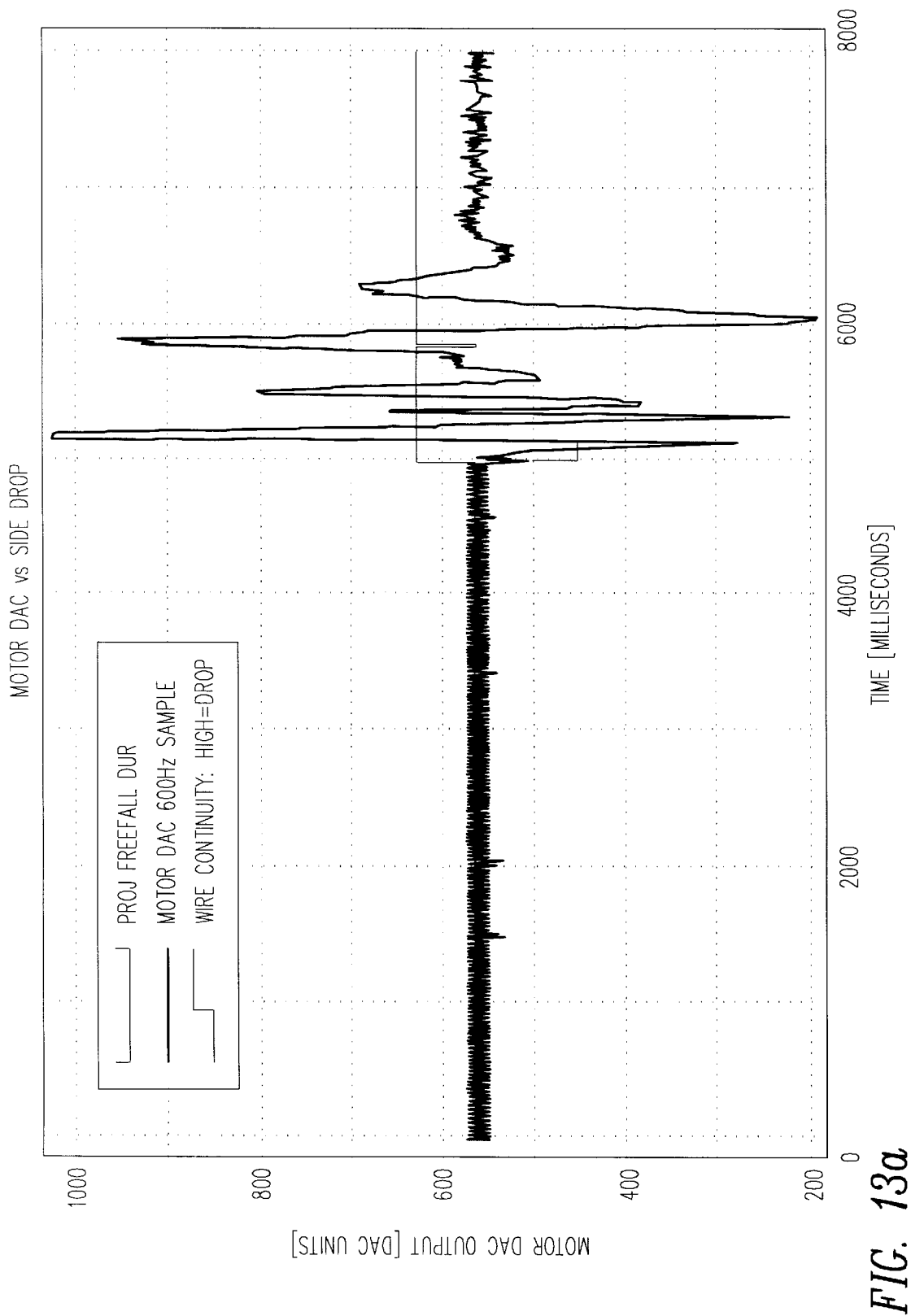
FIGS. 13a–b are a series of waveforms illustrating a side drop of the disk drive perpendicular to the axis of the connector side.
Figure 13B:
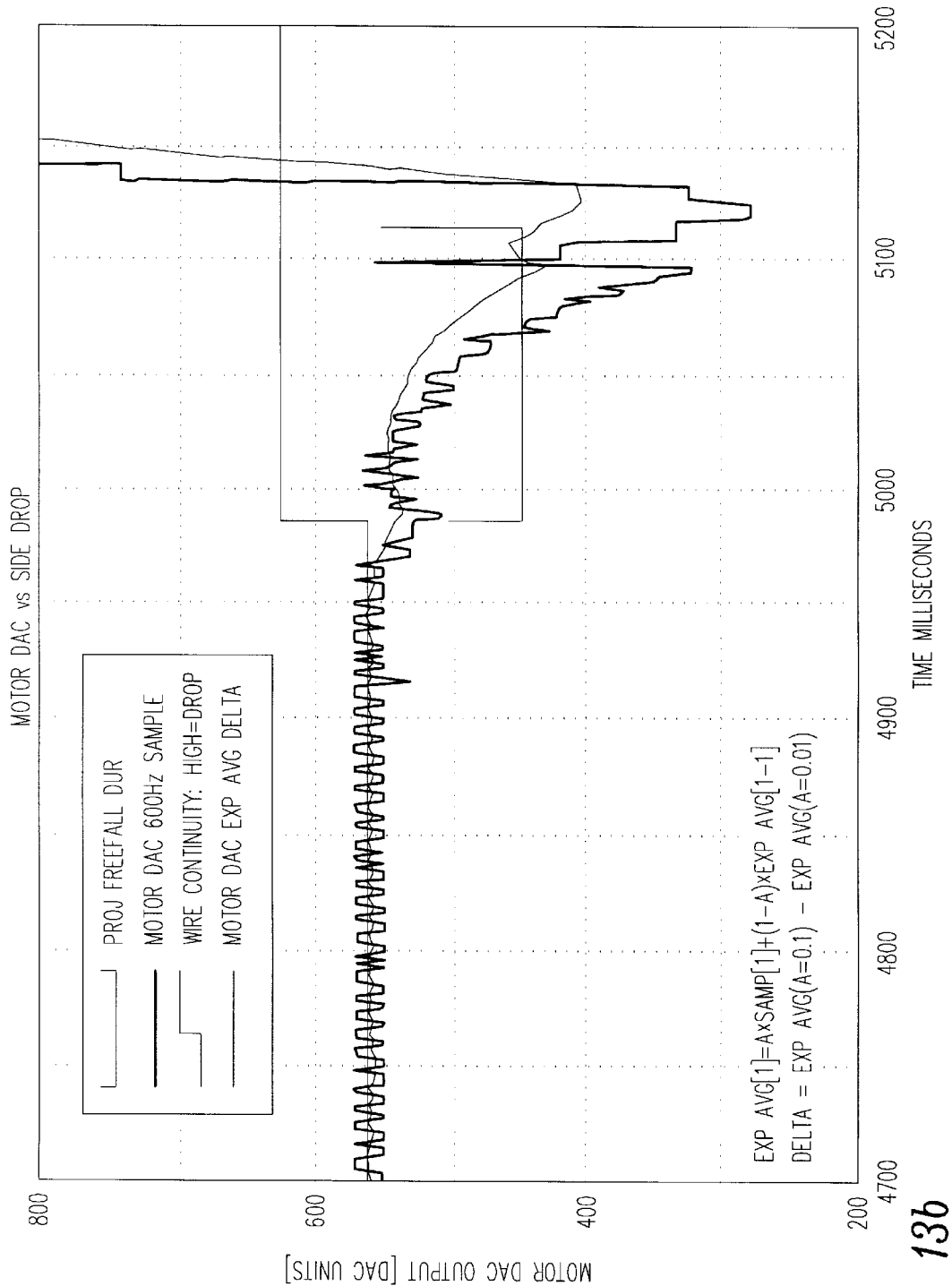

FIG. 9 shows the flow diagram of an alternative embodiment of the logic of a protective reflex system which also keys off a change in RPM as measured by the servo channel in the server processor system but uses motion signatures for comparison rather than established threshold points. The process starts by inputting to the servo processor 102 the PES signal, represented by function block 170, and the RPM signal, as represented by function block 172. The servo processor 102 takes each iteration of the digitized RPM signal, appends it to a digital vector in the random access memory RAM 108 and shifts it. This process, represented by function block 174, generates a waveform in time representing the RPM at successive SIDs. This waveform may be filtered using standard methods well known in the art. This waveform in time is compared against a library of motion signatures stored in RAM 108 in decision block 176. The library of motion signatures in RAM 108 is derived during the hard disk drive development by subjecting the hard disk drive to known impulses in various combinations of direction and acceleration. When the waveform in time matches one of the motion signatures suggesting a potentially damaging motion is occurring, a high priority interrupt is triggered to retract the actuator and unload the suspension/slider assembly, represented by function block 182.

At this point in the flow diagram, the main reflexive action, i.e., unloading of the sliders, has been accomplished. Further action can optionally be taken to enhance the protective system according to the invention. Following the unload action, a power down procedure (not shown) may be called shutting down the entire hard disk drive, or a continuing check loop to determine if the motion has ceased shown in decision block 184 may be used.

Returning to the decision block 176, if the waveform in time does not match the motion signatures in the RAM 108, the signal processor 102 adjusts the coil current and motor control, represented by function blocks 178 and 180 respectively. This action represents the normal control function of the servo processor 102 in maintaining read head on-track position and constant disk stack RPM.

FIGS. 10–13 illustrate several examples of motion signatures that may be stored in the library of motion signatures as described in FIG. 9. FIGS. 10a–10d show a vertical drop of the disk drive, and more specifically, FIG. 10a illustrates a disk drive dropped along the spindle axis with the card up approximately 6.5 cm, FIG. 10b is an enlarged view of the freefall time of the waveform shown in FIG. 10a, and FIGS. 10C and 10d are repeats of FIGS. 10a and 10b, using 10 point filtering to filter out noise from the early stages of the waveform. FIGS. 11a–11c illustrates the waveform generated by a rolling drop of the disk drive around the connector side 61 axis, and more specifically, FIG. 11a shows the full trace of the waveform of a rolling drop around the connector side 61 axis for a distance of 6.5 cm, FIG. 11b is an enlarged view of the waveform during the freefall time, and FIG. 11c is a repeat of FIG. 11b, using 10 point rolling averaging to reduce noise. FIGS. 12a–12c illustrate the waveform generated by a side drop of the disk drive, and more specifically, 12a shows a side drop of the disk drive perpendicular to the connector side 61 for a distance of 6 cm, FIG. 12b is an enlarged view of the freefall time illustrated in FIG. 12a, while 12c is a repeat of 12b using 10 point rolling averaging to reduce noise. Lastly, FIG. 13a shows the waveform generated by a disk drive dropped 8 cm perpendicular to the connector side 61 and FIG. 13b shows an enlarged view of the freefall time of FIG. 13a.

The motion signatures illustrated in FIGS. 10–13 are representative of the motion signatures that may be stored in the servo processor RAM as a library of potentially hazardous motions. Examination of the waveforms clearly show that a 10 millisecond window is sufficient to determine whether potentially hazardous motion is occurring. Thus a total response time of the system to detect and take protective action in the event of a fall or other damaging event is significantly less than the 250 milliseconds it takes to fall one foot.

While the invention has been described in terms of a single preferred embodiment with optional features, those skilled in the art will recognize that the invention can be practiced with modifications within the spirit and scope of the appended claims.

What is claimed is:

1. A method of preventing disk damage in a disk drive system comprising the steps of:

reading a motor current signal;

generating a first and second exponential average of the motor current signal, said first and second exponential averages having different decay time constants;

comparing the difference between the first and second exponential averages with a threshold value; and generating an interrupt if the exponential average difference exceeds the threshold value.

2. The method of preventing disk damage in a disk drive system as set forth in claim 1, wherein one of said first or second exponential average is comprised of a motor DAC signal with a time decay constant of one.

3. The method of preventing disk damage in a disk drive system as set forth in claim 1, further comprising the step of retracting an actuator arm to move the heads to a data free zone of a disk in response to said interrupt.

4. The method of preventing disk damage in a disk drive system as set forth in claim 1, further comprising the step of unloading a suspension assembly from over a surface of a disk in response to said interrupt.

5. The method of preventing disk damage in a disk drive system as set forth in claim 1, wherein said motor current signal is comprised of a motor DAC signal.

6. In a hard disk drive comprising at least one disk rotatably mounted on a spindle, a motor for rotating the disks on the spindle, an actuator assembly including a positioner arm and a magnetic recording head/suspension assembly, the actuator assembly responsive to signals from a servo processor for positioning the magnetic recording head over the disks, a system for preventing harmful contact between the magnetic recording head and the disk in the hard disk drive comprising:

means for reading a motor current signal;

means for generating a first and second exponential average of a motor current signal, said first and second exponential average having different decay time constants;

comparator means for comparing the difference between the first and second exponential averages with a threshold value stored in memory; and means for generating an interrupt if the exponential average difference exceeds the threshold value.

7. The system for preventing harmful contact between the magnetic recording head and the disk in the hard disk drive as set forth in claim 6, further comprising:

means for retracting the actuator assembly to move the magnetic recording head to a data free zone over the surface of the disk in response to said interrupt.

8. The system for preventing harmful contact between the magnetic recording head and the disk in the hard disk drive as set forth in claim 6, further comprising:

means for unloading the magnetic recording head/suspension assembly from the surface of the disk in response to the interrupt.

9. The system for preventing harmful contact between the magnetic recording head and the disk in the hard disk drive as set forth in claim 6, further comprising memory means for storing at least one threshold value in memory.

10. A method of preventing disk damage in a disk drive system comprising the steps of:

reading a disk rotational velocity signal;

generating a first and second exponential average of the disk rotational velocity signal, said first and second exponential averages having different decay time constants;

comparing the difference between the first and second exponential averages with a threshold value; and generating an interrupt if the exponential average difference exceeds the threshold value.

11. The method of preventing disk damage in a disk drive system as set forth in claim 10, further comprising the step of retracting an actuator arm to move the heads to a data free zone of a disk in response to said interrupt.

12. The method of preventing disk damage in a disk drive system as set forth in claim 10, further comprising the step of unloading a suspension assembly from over a surface of a disk in response to said interrupt.

* * * * *